INVENTORS
ARTHUR J. STANTON
DAVID F. ANDERSON
RICHARD E. TAYLOR
JOHN B. KING

ATTORNEYS

INVENTORS
Arthur J. Stanton David F. Anderson
Richard E. Taylor John B. King
BY
ATTORNEYS

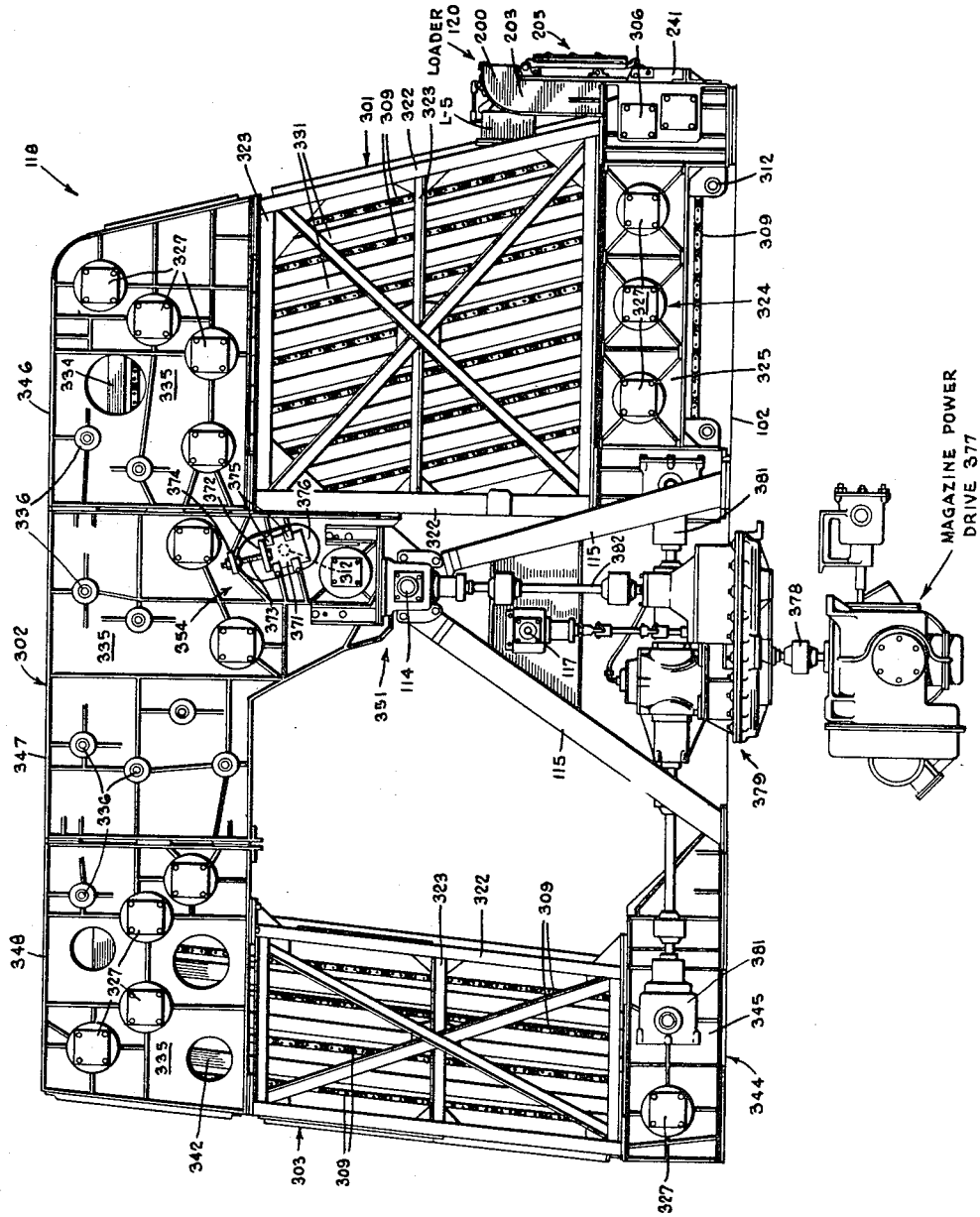

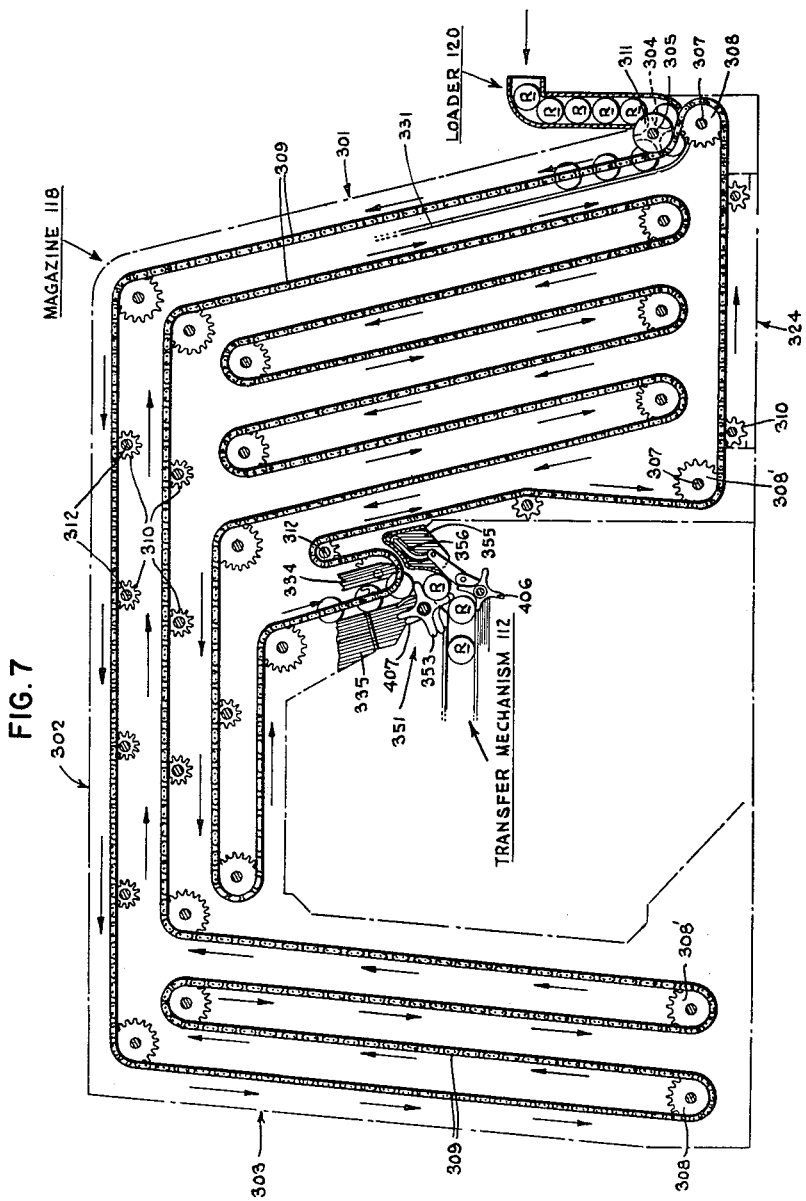

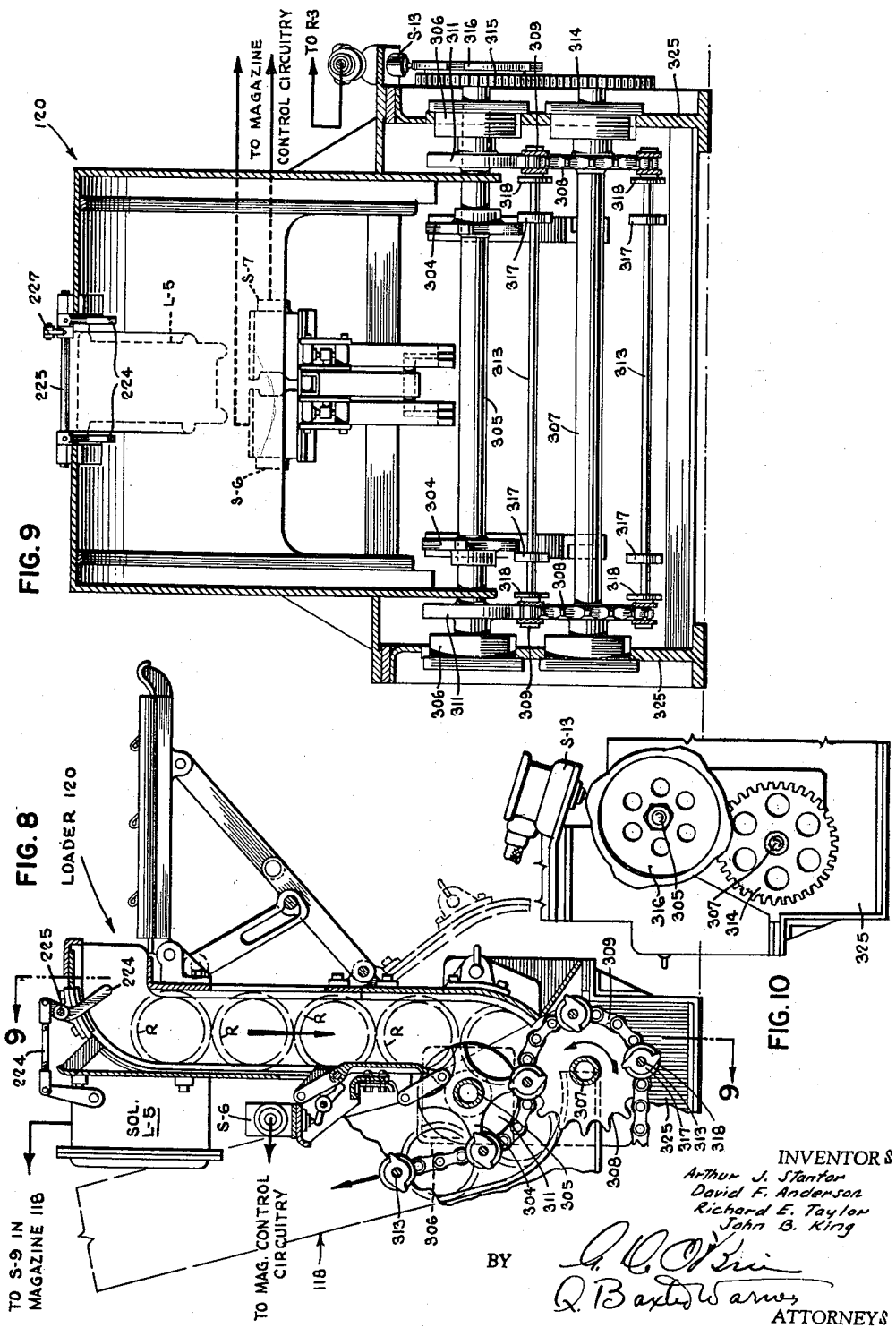

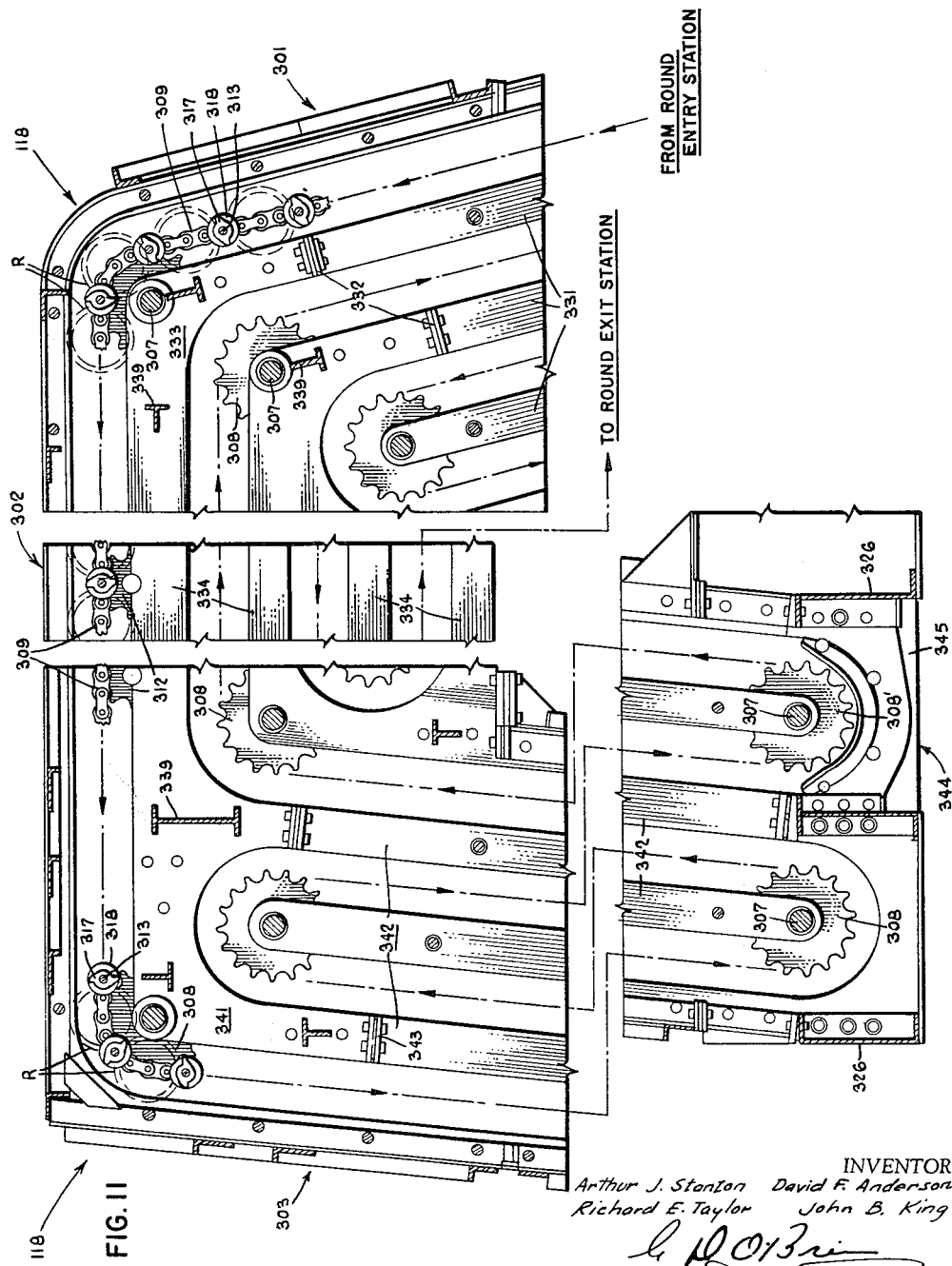

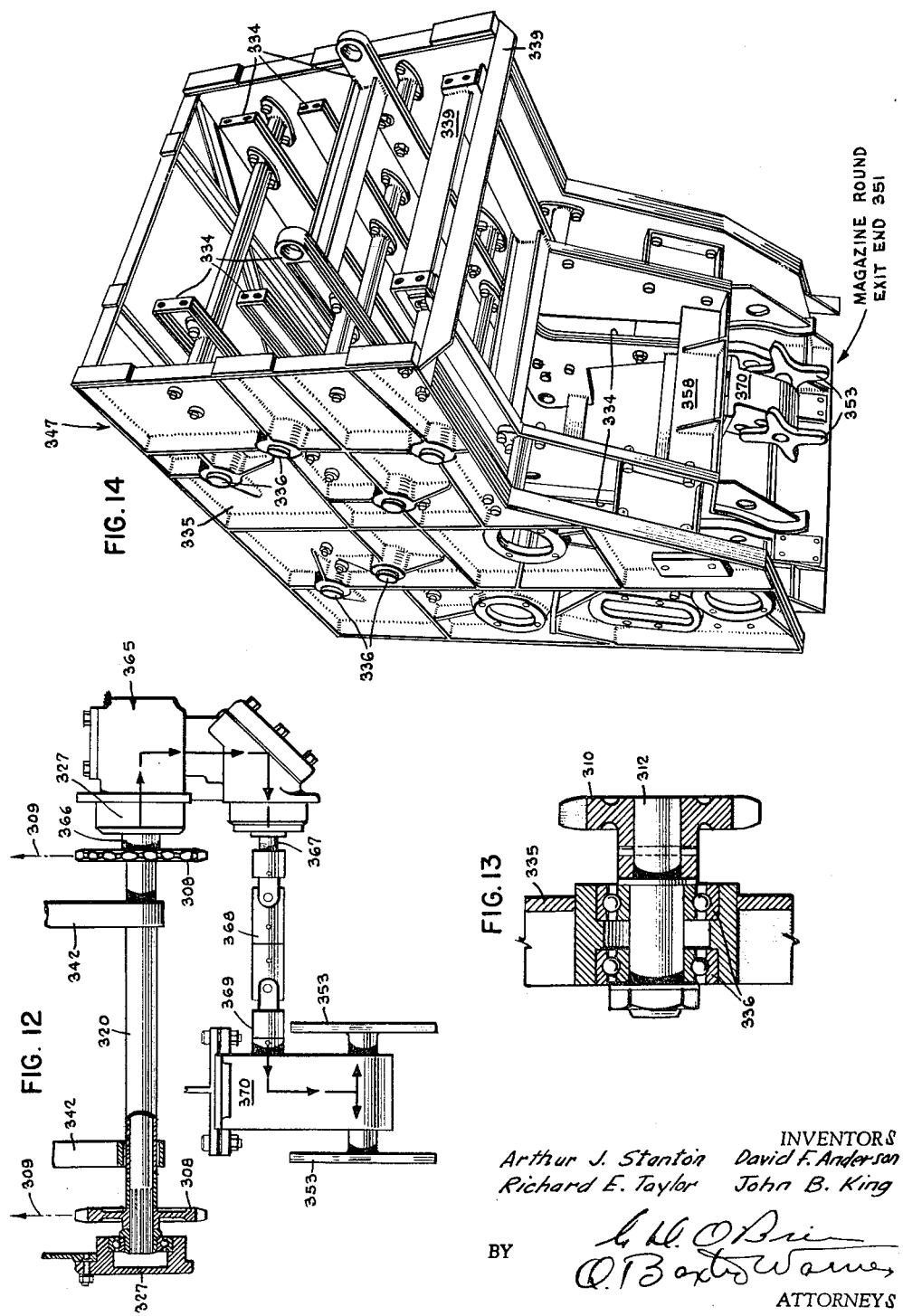

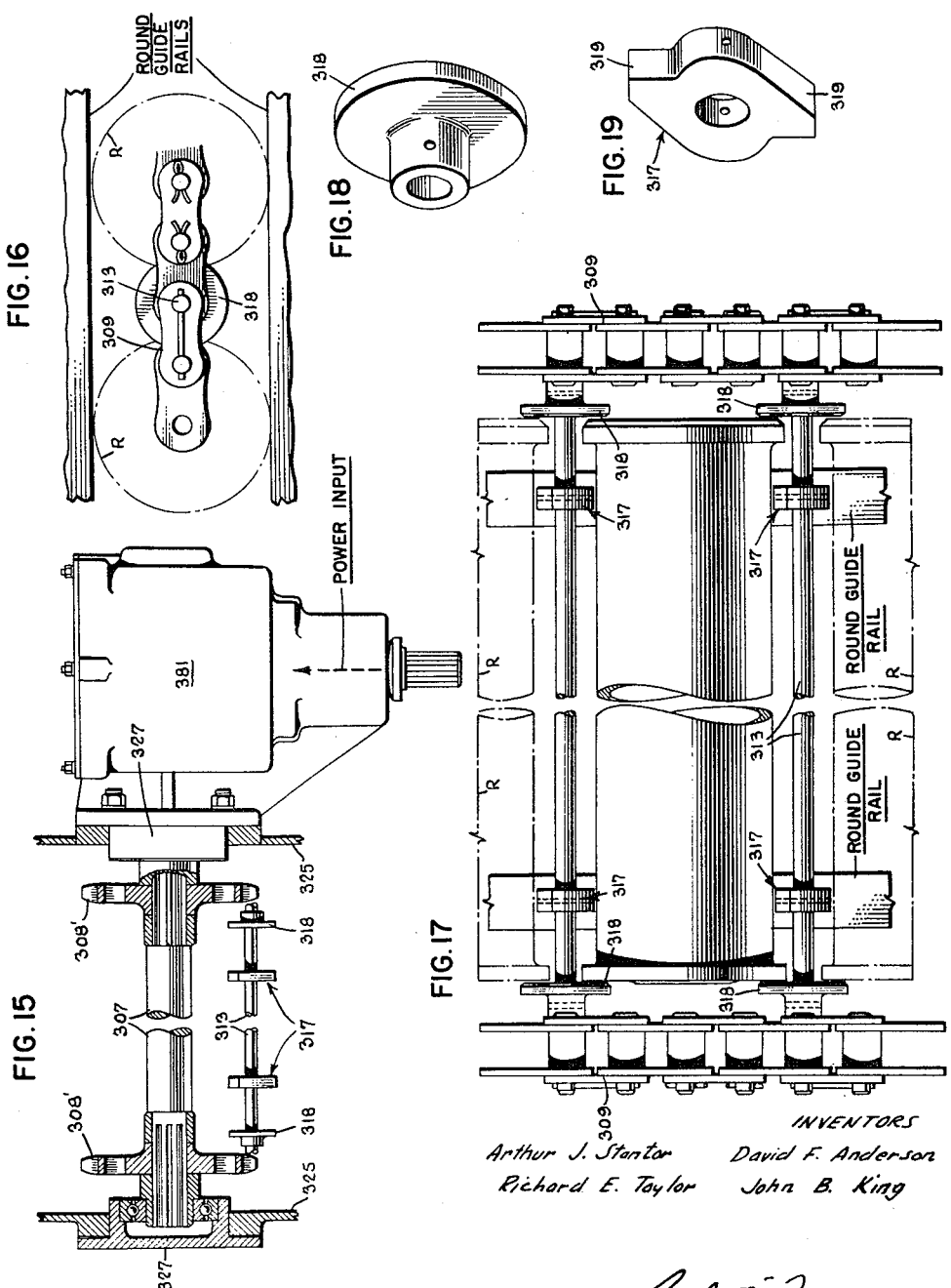

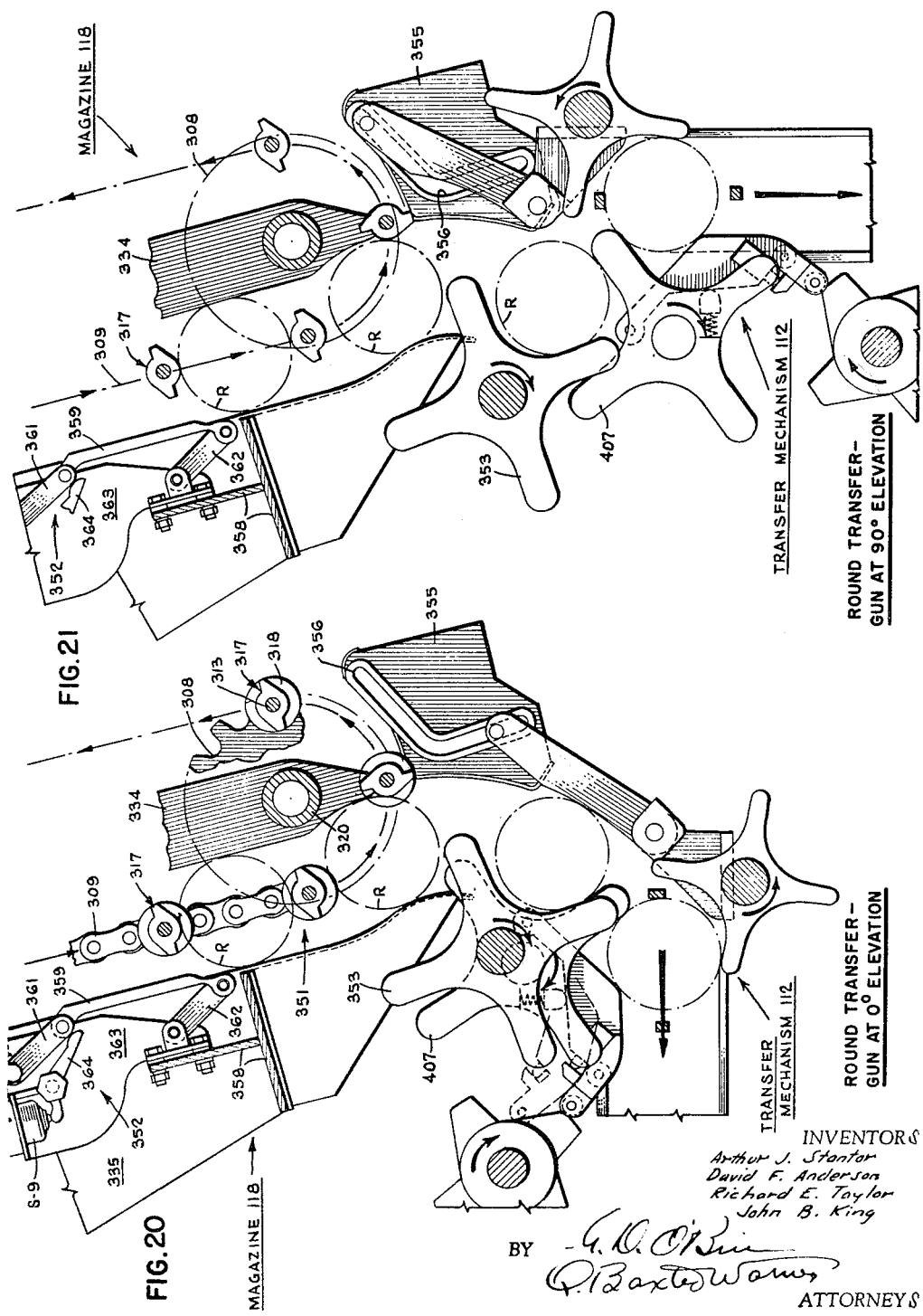

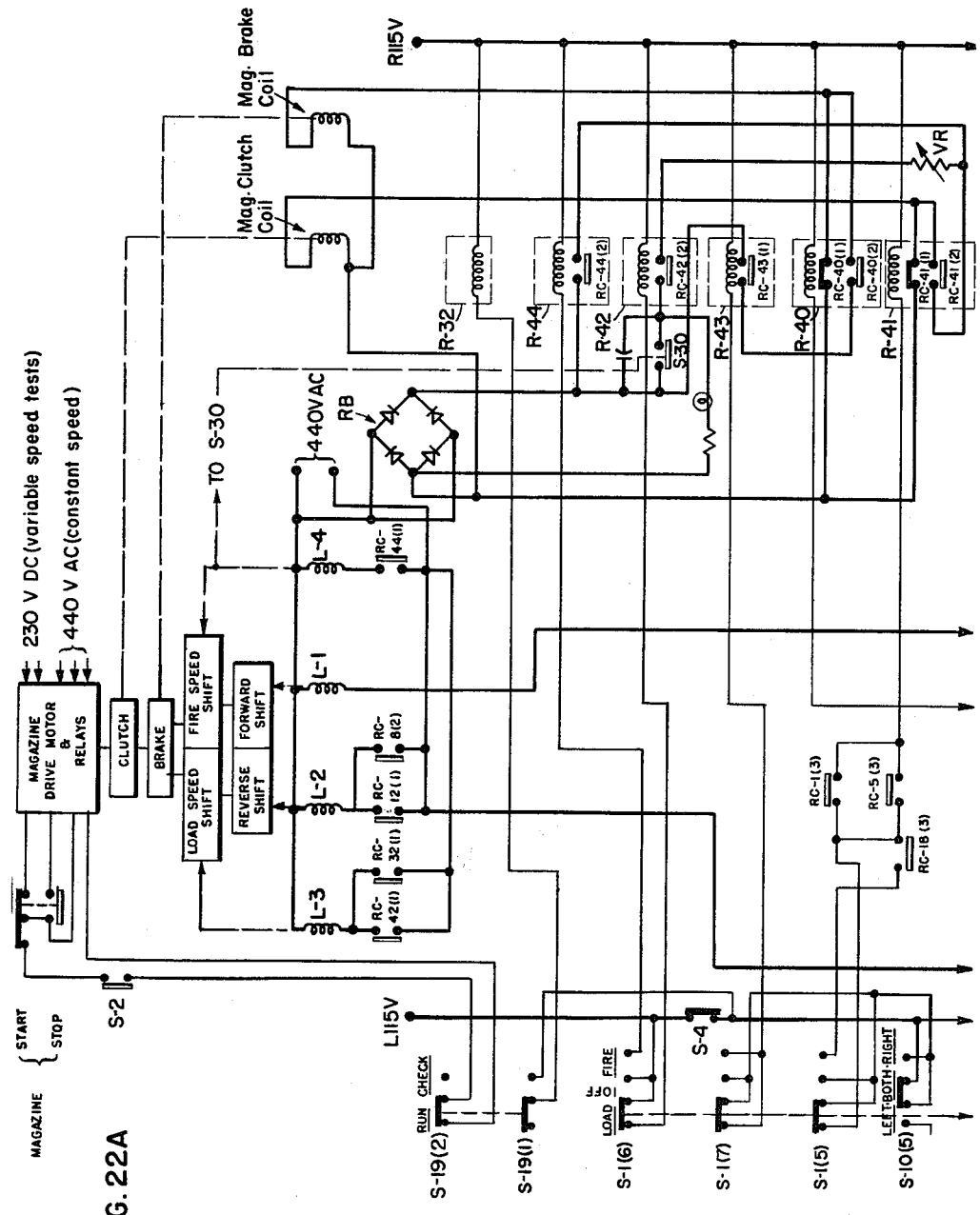

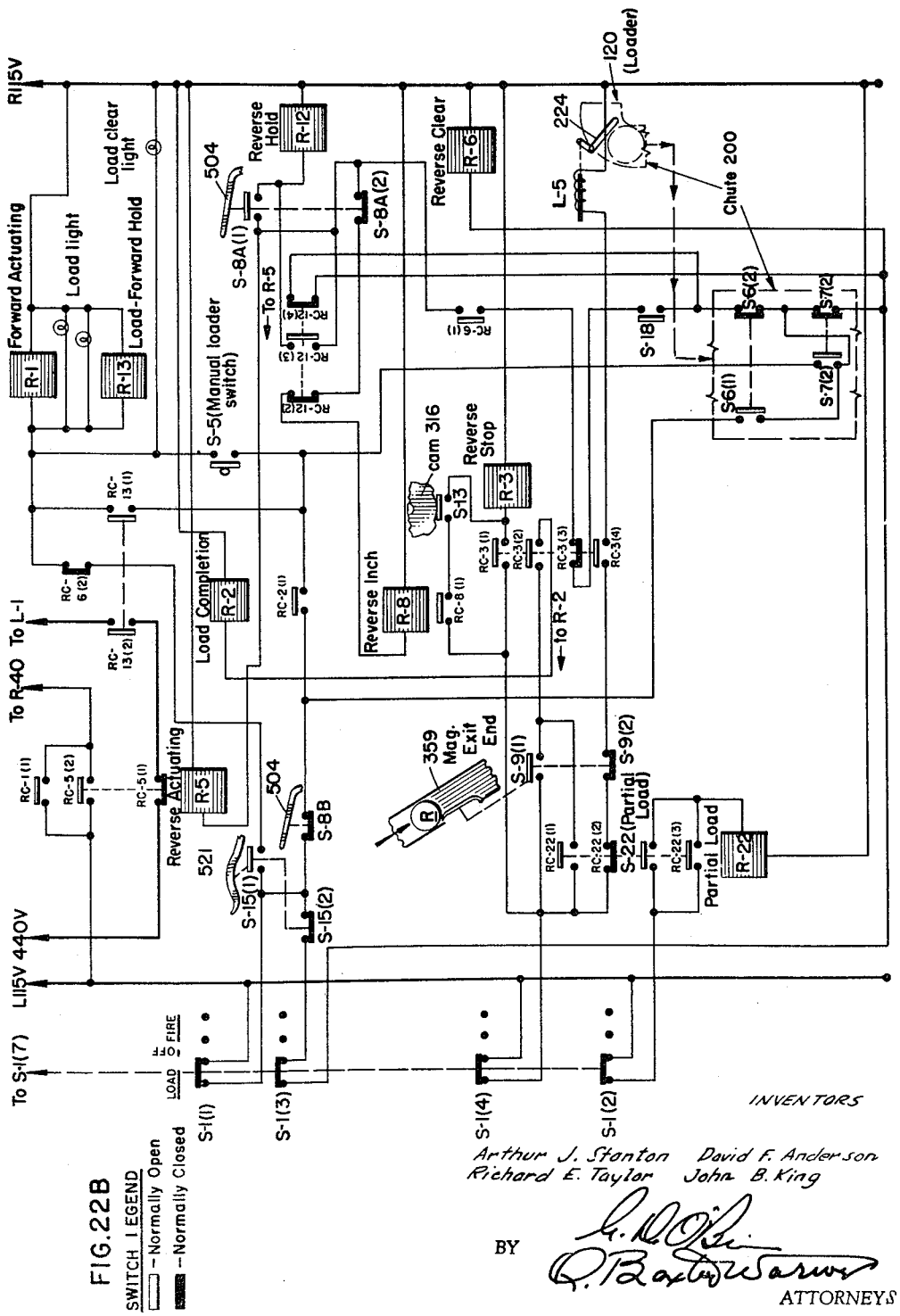

FIRING CIRCUIT

United States Patent Office

3,169,445
Patented Feb. 16, 1965

3,169,445
MAGAZINE MECHANISM
Arthur J. Stanton, Bethesda, Md., David F. Anderson, McLean, Va., Richard E. Taylor, Hyattsville, Md., and John B. King, Riverside, Calif., assignors to the United States of America as represented by the Secretary of the Navy
Filed June 3, 1957, Ser. No. 663,325
11 Claims. (Cl. 89—33)
(Granted under Title 35, U.S. Code (1952), sec. 266)

The invention described herein may be manufactured and used by or for the Government of the United States of America for governmental purposes without the payment of any royalties thereon or therefor.

The invention disclosed and claimed herein is a portion of the system disclosed and claimed in copending application Serial No. 663,319, filed June 3, 1957, for Rapid Fire Gun.

The present invention relates to an ammunition handling device for use with a projectile directing and firing system which includes a low velocity, rapid fire gun and mount therefor. More particularly, this invention is directed to an ammunition handling device capable of stowing a sufficient number and feeding at a sufficient rate rounds for a weapon suitable for a saturation zone type of protective or assault fire and which is especially well adapted for shipboard antiaircraft use.

Heretofore, antiaircraft guns of both large and small calibers have been devised for employment against high and low altitude attacking planes. Although the large caliber guns are effective at high altitudes when properly used, these guns are generally ineffective at low altitudes and short ranges because, among other reasons, of their slow rate of fire and the more effective evasive action taken by aircraft at low altitudes. Consequently, guns generally in use against low flying aircraft have been of a small caliber and in the machine gun class in order to obtain a rapid rate of fire and cope with the evasive action of aircraft attempting to avoid the zone of fire. However, the use of armor around the vital parts of aircraft has increased considerably and it has been found that the smaller caliber guns could make a number of hits without reaching a vital part, and, therefore, the attacking aircraft would, in many cases, continue to attack.

With conventional guns, as the caliber increases, the weight of the many gun components as well as the gun itself increases greatly. Heavier structural members are needed to load, stow and transfer ammunition. The recoil forces generated require heavier mounting and driving structures. Consequently, aboardship the number of guns that can be installed is limited by the weight factor alone. Furthermore, the handling of conventional large caliber case ammunition presents problems because of its size and weight, such ammunition not being adapted to belt or clip type feeding as used in the machine gun class weapons.

The use of large guns and mounts generally prohibits the stowage of ammunition or maintenance of magazines on the same level on which the gun is mounted because of space requirements. Thus, the ammunition stowage, including ammunition in the magazine, is at a lower level, often employing three or more decks of the ship to contain all the necessary equipment. Location below decks complicates the problem of feeding ammunition from a magazine to large caliber guns and necessitates the installation of elaborate ammunition hoists with associated large gains in overall weight and complexity of the ammunition handling equipment.

The present invention overcomes many of the disadvantages of the prior art magazines in that it provides an automatic, rapid feed, lightweight, device for the feeding and stowage of relatively large caliber ready ammunition of the symmetrically cased rocket assisted projectile type. The entire magazine is relatively small and compact as compared with the prior art magazines for similar caliber weapons, none of which are known to be capable of handling an equivalent amount of ammunition as the present invention. The magazine of the present invention is mounted above decks adjacent a gun and is of a large capacity which makes possible a high rate of automatic continuous fire for extended periods of time. The ammunition, with which the present invention is particularly useful, is a rocket propelled projectile enclosed in a symmetrical container or case which functions both as a storage case and as an expendable gun chamber when the projectile is fired. The projectile is fired by the ignition of a reduced power charge within the container and is propelled through the barrel at a relatively low velocity. While within the rifled gun barrel, the rocket propellant motor ignites and, after clearing the muzzle end of the gun barrel, the projectile accelerates to a much higher velocity comparable to conventional projectiles. The present invention assists in making possible machine gun rates of fire by moving large caliber rocket assisted ammunition through the magazine to an associated magazine-to-gun transfer mechanism, which forms no part of the present invention.

Although the magazine is disclosed herein as being one for the handling of the above-described type of ammunition, it is to be understood that other types of ammunition also may be advantageously used therewith or that the inventive concept may be employed in the conveyor art.

It is an object of the present invention to provide a magazine capable of feeding, at a high cyclic rate, large caliber rocket assisted projectiles to a gun or other launching apparatus.

Another object resides in the provision of a relatively lightweight magazine capable of stowing a large quantity of ready projectiles or missiles of large caliber.

An additional object is to provide a weapon subassembly capable of performing the function of a large capacity magazine capable of maintaining a substantially balanced condition during loading of the magazine, stowage of ammunition within the magazine and feeding of rounds from the magazine, this being accomplished by a weight distribution of the rounds and displacement thereof from the filling end to an opposite end, thence to the filling end, the rounds moving in a manner to diminish the end to end distance to a centrally located round exit point.

Still another object resides in the provision of an independent, large capacity, fixed magazine capable of stowing and feeding rounds to an associated relatively movable magazine-to-gun transfer mechanism at high rates of feed.

An additional object of the present invention resides in the provision of an automatic rapid feed missile magazine for use in a launching system and including mechanical and electrical interlocks to prevent round entry into the launcher mechanism in the event that all phases of firing conditions have not been met.

Another object of the present invention is to provide an automatic rapid feed magazine for stowing and feeding case enclosed missiles to a gun or other launching device.

A further object of the present invention is to provide an automatic, rapid feed ammunition magazine having means at the round entry station for transferring ammunition from a loading mechanism to the magazine and vice versa without jamming of the ammunition.

Another object resides in the provision of a rapid feed ammunition magazine having means adjacent the round exit station for actuating a mechanism in an associated loader to prevent additional ammunition from entering the magazine.

Other objects and many of the attendant advantages of this invention will be readily appreciated as the same becomes better understood by reference to the following detailed description when considered in connection with the accompanying drawings wherein:

FIG. 6 is a side elevation view of the round storage magazine and drive therefor of the present invention, the magazine structure being illustrated as having been removed from the gun mount structure;

FIG. 7 is a side elevation schematic view of the magazine showing the path of the rounds from an associated loader device at the right to an associated centrally located magazine-to-gun transfer mechanism;

FIG. 8 is a vertical sectional view through the magazine round entry end and an associated loader device which may be used for filling the magazine round spaces;

FIG. 9 is a vertical sectional view of the magazine round entry end as viewed from a line substantially corresponding to line 9—9 in FIG. 8 and illustrating the magazine feed star wheels and chain sprockets in elevation;

FIG. 10 is a vertical side elevational view of a portion of the right-hand side of the magazine at the round entry end as viewed in FIG. 9 and showing cam and switch means employed during unloading or reloading of a partially filled magazine;

FIG. 11 is an enlarged detailed composite view of portions of the magazine of FIGS. 1 and 2 showing the structural details thereof;

FIG. 12 is a top plan view of a star wheel and drive mechanism therefor located at the round exit station of the magazine;

FIG. 13 is a transverse sectional view of one of the magazine chain idler sprockets and the bearing support thereof;

FIG. 14 is a perspective view taken from below and to one side of the center section of the magazine and illustrating the arrangement of the guide rails and round exit star wheels;

FIG. 15 is an enlarged top plan view of a portion of one of the magazine chain sprocket drives;

FIG. 16 is an enlarged side elevation view of a portion of one of the magazine carrier chains;

FIG. 17 is an enlarged plan view of a portion of the magazine carrier chains with one round being shown in carried position and portions of others in carried position being shown in phantom outline;

FIG. 18 is a detailed perspective view of one of the round end engaging retainers shown removed from the round carrier chain;

FIG. 19 is a perspective view of one of the between round spacing lugs shown removed from the round carrier chain;

FIGS. 20 and 21 are enlarged vertical detail views of the juncture between the magazine round exit end and an associated variable angle, magazine-to-gun transfer mechanism round entry station showing round interchange therebetween and a switch interlock mechanism for controlling the filling of rounds into the magazine;

FIGS. 22A and 22B represent the electrical circuitry employed during loading and unloading of the magazine.

General mount description

Figure 1:
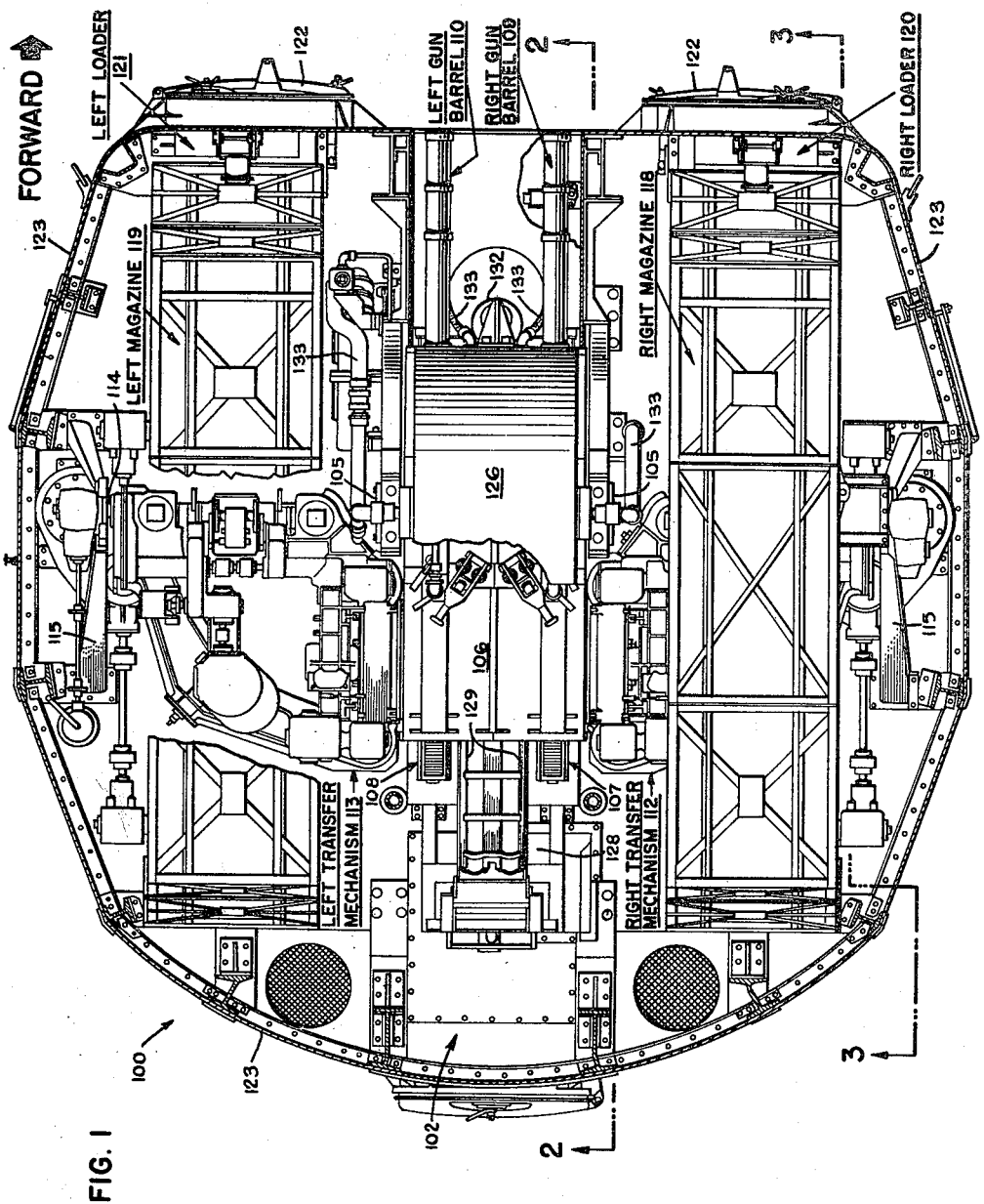
FIG. 1 is a top plan view with portions broken away of a twin gun mount embodying the present invention.

Referring first to FIGS. 1 through 5 which are general arrangement views of the entire system of the present invention, it will be observed that a twin weapon mount, generally designated by numeral 100, is shown mounted on a fixed stand 101 such as those which are presently in use on naval vessels. The mount comprises a platform carriage 102 which supports thereabove the gun and round handling mechanisms and carries therebeneath mount drive and power components. The carriage 102 is rotatably supported for movement in train on roller bearings (not shown) which engage a mating roller path (not shown) formed in a fixed training circle gear 103. A carriage mounted drive pinion 104 is drivingly meshed with the training circle 103 for driving the mount in train. The additional power and associated equipment such as motors, firing cutouts, brakes, clutches and buffers, carried beneath the carriage, from no part of the present invention and will not be described in detail.

Figure 2:
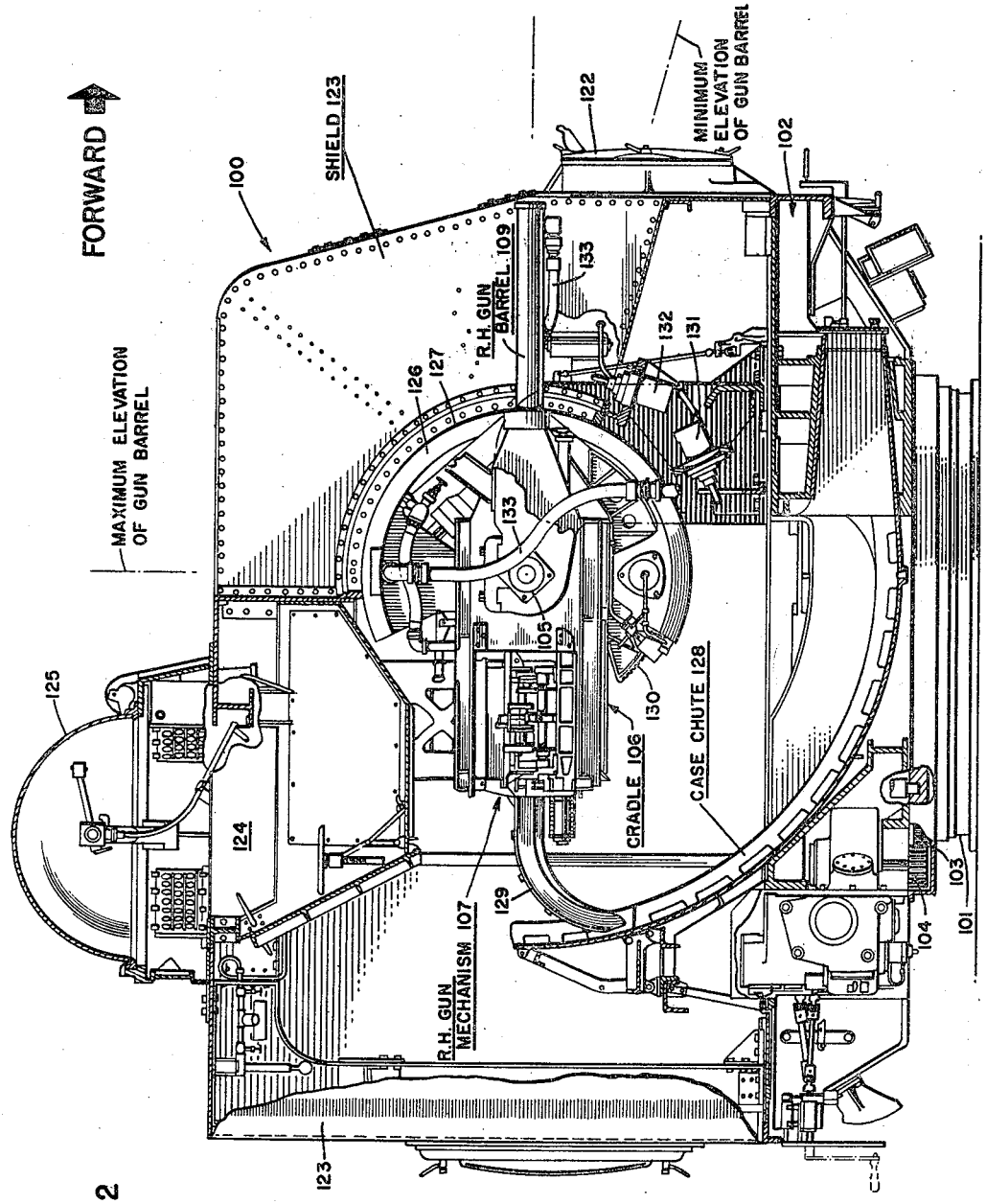
FIG. 2 is a vertical sectional view of the mount of FIG. 1 taken along a line substantially corresponding to line 2—2 of FIG. 1.
Figure 3:
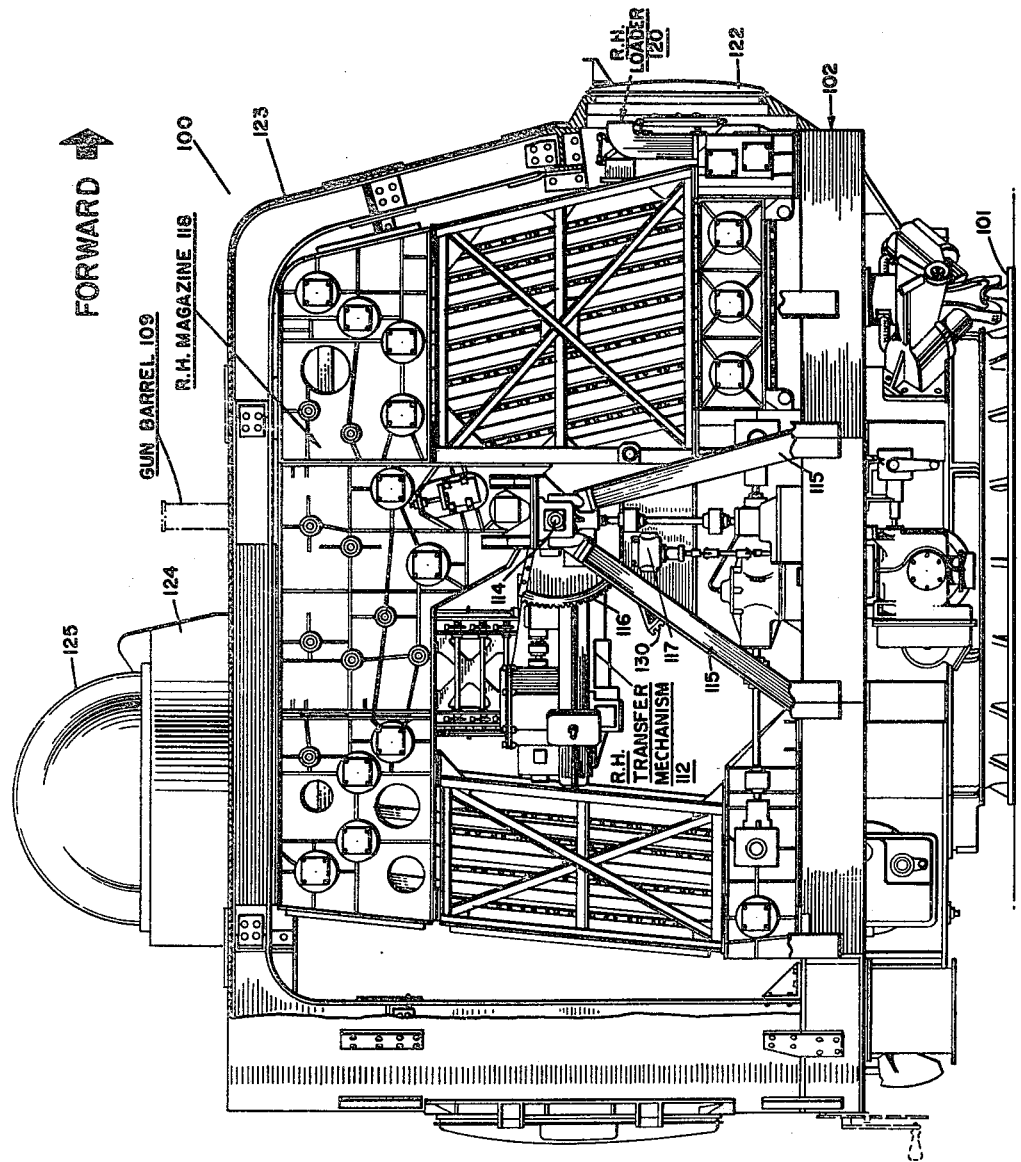
FIG. 3 is a vertical sectional view of the gun mount of FIG. 1 as viewed from a line substantially corresponding to line 3—3 of FIG. 1.
Figure 4:
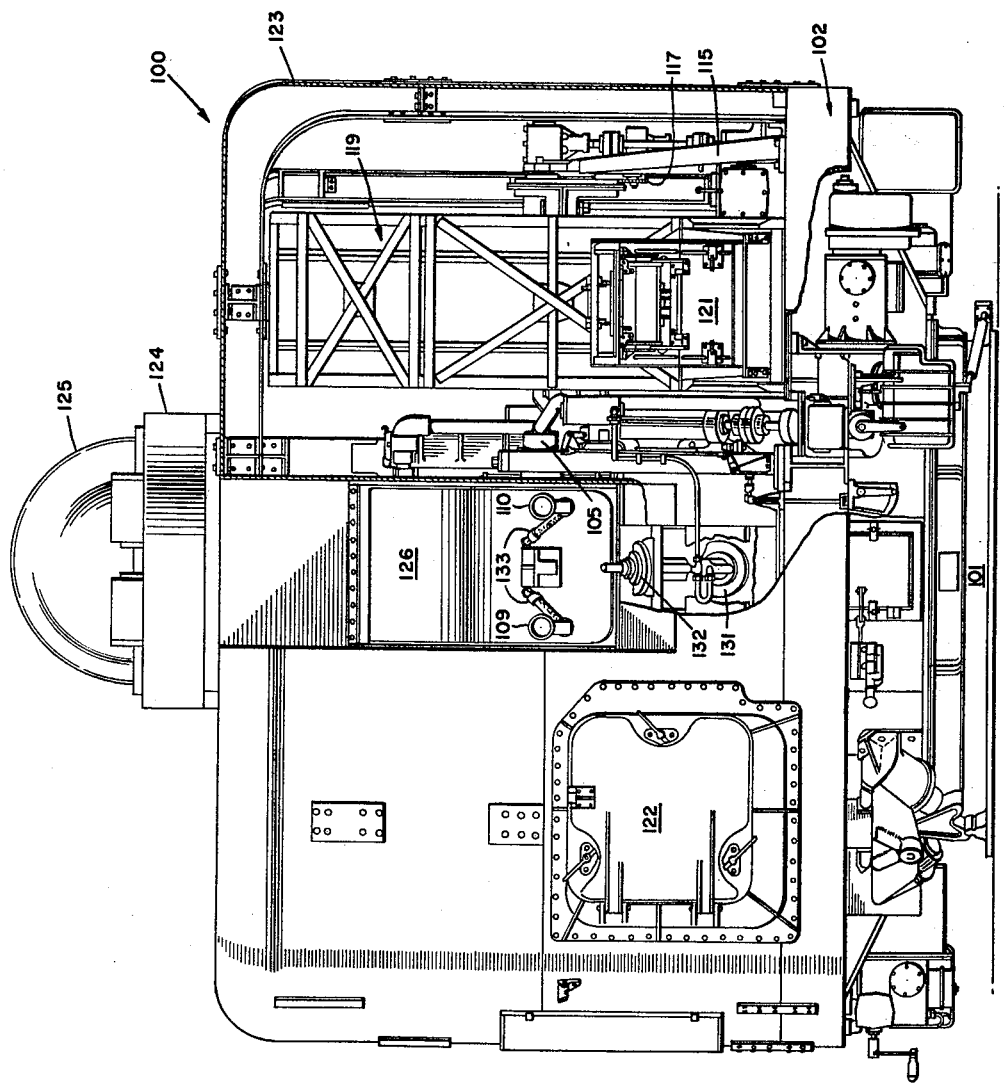
FIG. 4 is a front vertical elevational view of the gun mount of FIGS. 1, 2 and 3 with a portion of the shield broken away.
Figure 5:
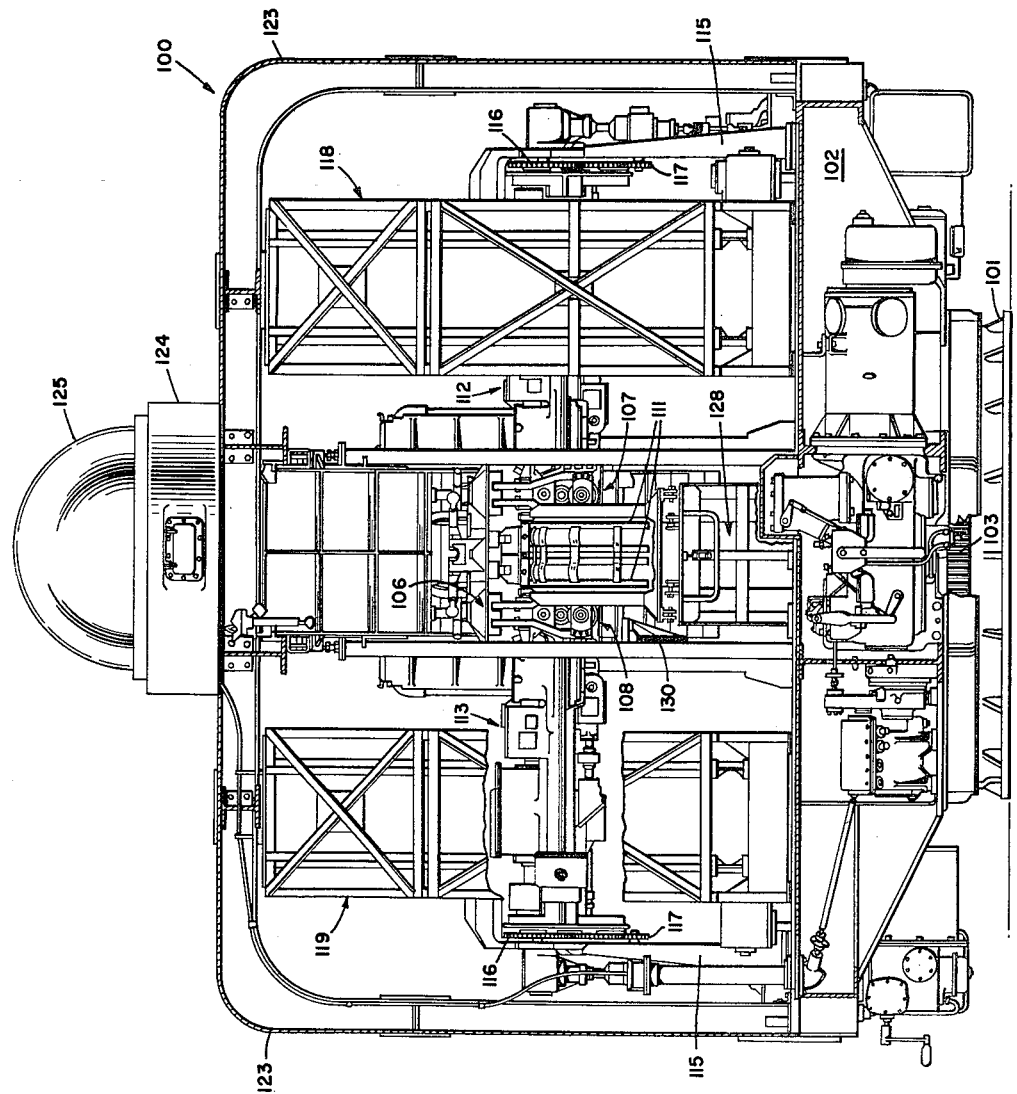
FIG. 5 is a rear elevational view of the gun mount with portions of the shield and stand removed.

Located centrally atop the carriage is a pair of trunnion bearings 105 which support therebetween, an elevatable cradle 106. An elevating arc 130 is secured to the left-hand side of cradle 106, as viewed in FIG. 5, and is driven by a conventional elevating pinion (not shown) to move the entire cradle in elevation. An elevation stop buffer 131 and a depression stop buffer 132 are provided, as shown in FIGS. 2 and 4. The central portion of the cradle supports a pair of right and left-hand gun mechanisms 107 and 108, each gun mechanism having a rifled barrel 109 and 110, both respectively, protruding from the front portion of the cradle. A twin case ejection system 111 is also carried by the cradle and is located between the gun mechanism. Secured to opposite sides of the cradle and elevatable therewith, are right and left-hand round transfer mechanisms 112 and 113, respectively, the outer ends of which are supported in bearings 114 carried by similar right and left-hand pedestals 115 secured to the top of the carriage 102. An elevation response arc 116 is also secured to the outboard ends of each round transfer mechanism and is in contact with elevation response gearing 117 connected to suitable firing cutouts during adjustment of gun elevation. In addition, the elevation response gearing repositions certain elements in the transfer mechanism drive gearing to maintain alignment of certain components in the transfer mechanism regardless of gun elevation. This is accomplished by means of suitable differential gearing (not shown). Right and left-hand round storage magazines 118 and 119, respectively, are mounted outboard of the cradle on the carriage and overlie the major portion of the top surfaces of each round transfer mechanism. Right and left magazine loaders 120 and 121, respectively, are mounted on the forward and lower front end of each magazine through which rounds may be fed to the magazine to load endless round carrying chains (not shown) moving through each magazine. Access doors 122 permit access to the loader during periods of magazine loading and unloading.

A shield 123 secured to the carriage, completely encloses the mount units and forms a weather seal for the mount units and mount operator. The top central portion of the shield supports a control compartment 124 which includes a transparent observation dome 125 extending above the shield. A gun port shield 126 mates with a circular path 127 formed in the shield and may have inflatable waterproof sealing elements (not shown) for sealing the movable elements when in stowed condition.

A fixed case ejection chute 128, formed in the central floor portion of the carriage, is curved to conform with the sweeps of a pair of case deflector assemblies 129 carried by the aforementioned case ejection system 111 and delivers empty cases out of the front end of the mount. Suitable coolant lines 133 are employed to carry water to and from the gun cooling system.

*Magazine*

A compact, large capacity, magazine in the general shape of an inverted U is provided for each gun, and, in the instant disclosure, the right magazine is illustrated in detail, the left magazine being similar except for a reversal of parts. The passage of rounds into and from the magazine will be briefly described before proceeding with the detailed description of the magazine structure. As best illustrated in FIG. 7, when the rounds have passed through an associated device, they are at the forward and lower end of the inverted U-shaped magazine. The rounds are then engaged by a pair of magazine feed star wheels operating in synchronism with round engaging lugs mounted on relatively spaced rods extending between a pair of endless chains. When engaged by the chain the path of the rounds is up the front leg of the U-shaped magazine, across the top, down the back leg and, after making a series of such similar flights, the round emerges near the upper inner portion of the front leg. Suitable guide rails, both straight and curved, are disposed as needed throughout the magazine for guiding engagement with the rounds. The chains may be sprocket driven and sufficient idlers are provided to maintain the requisite tension and conform the chain to the various channels formed by the guide rails. At the round entry end of the magazine, cam and switch means are provided to control the magazine in the final stages of reverse drive during unloading and reloading operations of a partially filled magazine. The magazine round exit end contains switch means for controlling round engaging fingers in the associated loader device and also a pair of driven magazine exit star wheels cooperating with a series of additional star wheels on an associated transfer mechanism 112, which may be relatively movable with respect to the magazine.

Proceeding now with the detailed description of the structure of the magazine of the present invention and referring particularly to FIGS. 6 through 24, there are shown portions of the inverted, U-shaped magazine, generally designated by numeral 118 having an inclined forward leg portion 301, an upper and rearwardly extending portion 302 and a downwardly extending, inclined rear leg portion 303. As is best shown in FIGS. 6 through 9 at the front and lower end of the forward leg portion is located an associated loader device 120 which supplies rounds to a pair of magazine round entry end star wheels 304 secured to a cross shaft 305 journaled in bearing members 306 in the lower right hand left magazine side wall members 325. This loader device is described in greater detail in copending application Serial No. 663,324, filed June 3, 1954, for Loader Mechanism.

As shown in FIGS. 7 and 8, the shaft 305 is vertically and rearwardly displaced from a chain sprocket shaft 307 on which are mounted a pair of chain idler sprockets 308 over which run a pair of endless round carrying chains 309. Chain idler rollers 311 are freely carried by shaft 305 and function to maintain the chains in engagement with idler sprockets 308 and assure the maintenance of the desired configuration of the rapidly moving chains as they change direction of travel from the horizontal to a nearly vertical direction of travel. Rollers 311 also prevent whip or flexing of the chains. The idler sprockets 308 and 310, FIGS. 7 and 11, mounted on shafts 307 and 312, respectively, are employed for the additional purposes of establishing the desired travel path for the rounds at desired locations within the magazine and for supporting the chains along the length of the travel path. Referring to FIGS. 9 and 10, the chain sprocket and star wheel shafts 307 and 305 have synchronizing gears 314 and 315, both respectively, mounted on one end of each shaft, the gears maintaining a fixed relationship between the drive arms of the star wheels and the round engaging lugs carried by the chains. Additionally, an adjustable multilobed cam 316 is secured adjacent gear 315 on shaft 305, the cam engaging a switch S–13. This switch causes the magazine drive in reverse to stop with the star wheels 304 aligned in a position to again receive rounds from the associated loader device. This function will become more clearly apparent from the circuitry shown in FIGS. 22A and 22B, described hereinafter. Thus, the possibility of a round becoming jammed between star wheels 304 and the loader mechanism is eliminated.

Referring to FIGS. 9 and 17, it will be observed that on each of the rods 313 are secured, inboard of the chains, a pair of cam shaped, round engaging lugs 317. These lugs contact the reduced diameter portion of each round and are so spaced along the chain that a round is receivable between a pair of lugs on one cross rod and a pair of lugs on the next succeeding cross rod. Lugs 317 also function to reduce chain whip, the fingers 319 of the lugs 317 engaging the round guide rails, described later, when the chain departs by a certain distance from a straight-line configuration in any flight thereby to establish limits between which the chain may whip. By establishing such limits of chain whip it is assured that rods 313 will not be pulled beneath a round and thereby cause a jam of the equipment. Lateral motion of the round in a direction transverse to the chains is prevented by circular round engaging retainers 318, a pair being mounted on and secured to the end of each cross rod 313 adjacent the inner edge of each chain 309.

In FIGS. 3, 4, 5, and 6, the forward and rearward legs 301 and 303, respectively, of the magazine are disclosed as including open framework portions and may, if desired, be fabricated from vertically and horizontally extending angle bars 322 and 323, respectively. Reference is now made to FIGS. 6, 7, and 11 wherein the forward leg 301 is illustrated as being supported by a base 324 including a pair of horizontally extending channel shaped side walls 325 rigidly retained in parallel spaced lateral relationship by a series of cross members 326 similar to those on the rear leg, FIG. 11. The medial portions of the base side walls have a series of bearings 327 which support a plurality of cross, chain idler sprocket shafts 307, FIG. 7, each of which has a pair of chain engaging sprockets 308 over which run the round carrier chains 309. Spaced inboard from the side walls 325, and extending upwardly are a series of round engaging, vertically inclined, guide rails 331 by which the rounds are guided in their various movements through the magazine. The upper ends of these guide rails are rigidly connected as at 332 to smooth, continuous, mating curved portions 333 of horizontally extending guide rails 334 located in the upper central section 302.

The upper forward, upper central and upper rear sections 346, 347, and 348, respectively, FIG. 6, are made in substantially the same manner as the afore-mentioned base 324 in that they respectively comprise a pair of horizontally extending generally similar side walls 335 with a series of irregularly spaced bearings 327 supporting cross sprocket shafts 307, each shaft having a pair of transversely spaced sprockets 308 affixed thereto. In addition, as illustrated in FIG. 14, there are provided on the upper magazine sections a plurality of bearing assemblies 336, supporting stub shafts 312, FIG. 13, each stub shaft carrying a small idler sprocket 310. Adequate cross members 339 secured to the guide rails 334 and side walls 335 are supplied to insure rigidity of the entire unit. The horizontal rails 334, FIG. 11, in turn mate smoothly by way of curved portions 341 with rear, vertically inclined guide rails 342.

Rails 342 are rigidly connected to curved portions 341 of the horizontal rails by any suitable means such, for example, as that illustrated at 343. Rails 342 are rigidly affixed to the rear, lower base 344, this base being formed in substantially the same manner as the forward, lower base 324. The rear base comprises a pair of side walls 345, a plurality of bearings 327, FIG. 15, supporting similar cross sprocket shafts 307, each having a pair of transversely spaced sprockets 308 and 308' attached thereto.

Returning now to a further considerations of the upper central portion 347, and particularly referring to FIGS. 6, 7, 14, 20, and 21, it will be observed that on the lower side thereof, and adjacent the rear of the forward leg portion 301 is located the magazine round exit station, generally designated by numeral 351. This round exit station comprises a depending extension of the side walls 335 of the upper central portion 347 and carries a round loading stop mechanism 352, a pair of magazine exit star wheels 353, chain tension adjusting means 354 and a plate 355. Plate 355 is provided with a slot 356 for engagement with extensible round guide links, mentioned hereinafter, mounted on a cooperating transfer mechanism, generally designated by numeral 112 but forming no part of the magazine of the present invention.

The round loading stop mechanism 352, best viewed in FIGS. 20 and 21, is mounted on the upper side of a support plate 358 located above and to the rear of the round exit station 351 of the magazine and comprises a round engaging actuator bar 359 pivotally supported at its upper end by a pair of links 361 and at its lower end by a single link 362. The upper and lower links are in turn pivotally connected to a fixed central bracket 363 attached to support plate 358. On the central bracket a spring biased bell crank 364 urges actuator bar 359 into the path of the oncoming rounds. Presence of a round along the bar displaces the bar and rotates bell crank 364 to open switch S-9. Actuation of switch S-9 deenergizes solenoid L-5 on an associated magazine loader device causing round engaging fingers in the latter to move into the feed path of the rounds and prevent additional rounds from entering the loader device. The magazine drive will now continue for a long enough period to empty the loader device of remaining rounds therein and will feed and fill an adjacent magazine-to-gun transfer mechanism.

Located below the loading stop mechanism 352, FIGS. 12, 20, and 21, and supported from the same support plate 358 is a pair of magazine exit star wheels 353 engageable with the middle portions of the rounds. The star wheels are driven in synchronism with the round carrying chains 309 by means of a drive gear assembly referred to generally by numeral 365 secured to the magazine adjacent the gun side, as best disclosed in FIG. 12. The gear assembly 365 comprises an input shaft 366 directly coupled to a chain sprocket shaft 307. The power take-off sprocket shaft 320 is located in the round exit end of the magazine adjacent the exit star wheels. An output shaft 367 from gear assembly 365 has the same speed ratio of the input shaft and is coupled by flexible coupling 368 to the star wheel drive input shaft 369 and thence through suitable gearing contained within housing 370 to star wheels 353. Thus, the chains and the star wheels are constantly driven in timed relationship to secure smooth interchange of rounds from the magazine to the associated round transfer mechanism. As illustrated in FIGS. 20 and 21, these fixed star wheels 353 may, if desired, cooperate with two other pairs of relatively displaceable star wheels mounted on the transfer mechanism 112.

Suitable chain tensioning means 354, FIG. 6, briefly mentioned hereinbefore, may be mounted on the inside and outside faces of the side walls 335 of the upper central portion 347 of the magazine. This tensioning means includes mounting bearings (not shown) for a cross idler sprocket shaft 312, FIG. 7, having a slidable plate 371, FIG. 6, secured to each end thereof. One end of each slidable plate 371 has an upturned flange 372 which is drilled to receive a tension adjusting bolt 373, the other end of which is threadably adjustable in a support lug 374 mounted on side wall 335 of the magazine. The slidable plate is held down by a series of clamps 375 fastened to a grooved retaining plate 376 on which the slidable plate 371 moves. Thus, it will be seen that adjustment of the tension bolt 373 on each side of the magazine will move the slidable plates 371 fixed on the ends of the cross sprocket shaft 312 supported thereby and thus adjust the tension of the chains 309.

The magazine drive units, FIGS. 6, 7, and 15, include a magazine power drive 377 carried on the underside of the rotatable stand 102 and transmits power upwardly via shafting 378 to a combined magazine and transfer drive assembly, generally designated 379. At this point the power is split in horizontal forward and rearward directions to similar magazine chain drive housings 381 from which power is fed to drive sprockets 308' in the rearward and forward base portions 344 and 324, respectively. A vertical shaft 382 transmits power upwardly to the associated transfer mechanism 112.

Electrical system

Circuitry which provides for the operation of the present invention, except for the firing operation, is illustrated in FIGS. 22A and 22B. The firing circuit is disclosed in FIG. 23.

As illustrated in FIG. 22A, the magazine power drive unit is provided with an electric induction motor, which may be of the squirrel-cage type, coupled to an output shaft via gears through magnetically operated clutch and brake mechanism. The magazine drive motor of the invention, as disclosed herein, is driven by 440 volt, 60 cycle, 3 phase current. For testing purposes, 230 volt D.C. current is used. The various automatic devices for controlling the loading and firing speeds of the magazine are operated in response to activation of circuitry later described and supplied from a 115 volt, 60 cycle, single-phase current source. Some of the 440 volt, 60 cycle power is rectified by the rectifying bridge RB for exciting the magnetic brake and clutch for the magazine drive.

The magazine operates at two speeds: (1) for firing, the magazine chain moves forward at a high rate of speed such, for example, as 750 round stations per minute and (2) for loading and reversing, the speed is greatly reduced, the magazine chain moving at 60 round stations per minute, for example.

The shifting from one speed to the other and from one direction of chain travel to the other is accomplished by interlock controlled solenoids provided within the magazine drive unit. The 440 volt A.C. solenoids L-1 through L-4 shift the drive unit into forward, reverse, load and fire speeds, respectively. The load and fire solenoids L-3 and L-4, and the forward and reverse solenoids L-1 and L-2, both respectively, are paired on opposition.

The linkages of solenoids L-3 and L-4 are mechanically connected to switch S-30 to close the latter in response to energization of solenoid L-3 and to open the latter in response to energization of solenoid L-4. Thus, it will be understood that when switch S-1 is set at the FIRE position, switch S-30 will be open. When switch S-1 is set at either of the two remaining positions switch S-30 will be closed.

Switch S-30 provides means for supplying, via variable resistor VR, a reduced current through the magnetic clutch coil so that the magazine chain may be driven at selected speeds for testing purposes, these speeds being less than normal operating speeds. It will be noted that, during loading and testing cycles, under no condition will the clutch be engaged prematurely until the shift in speed from fire speed to load speed has been completed thereby closing switch S-30. Thus by adjusting resistor VR, the speed of rotation of the power output shaft from the clutch is reduced and the manual meshing of the mating teeth in the intermediate gearing between the load speed shift and the fire speed shift with either of the latter shifts is facilitated.

A push-button switch controls the operation of the magazine drive motor, the motor running as long as the switch is maintained in a depressed condition.

By means of ganged switch S-1, a choice may be made as to magazine operation, i.e. FIRE, OFF, or LOAD.

When switch S-1 is set at the LOAD position, magazine control circuits are cleared for the loading operation, gun control circuits (not shown) become inactive, and the magazine chain automatically positions itself to receive ammunition from an adjacent loading device which forms no part of the present invention. When the magazine chain is correctly positioned, control reverts to the control panel of the associated loader until the magazine is filled, or the partial load switch S-22 is manually closed by the mount captain, or until fire operation is commenced. When switch S-1 is set in the FIRE position, firing operation is made possible by the circuitry described hereinafter.

Switch S-10 provides means whereby a choice may be made as to which gun will be active. Because each magazine and gun has its own control features, the guns, and thus the magazines, may be respectively fired or fed individually or simultaneously.

Ganged switch S-19 in the CHECK position provides means for rendering the magazine motor and firing circuits inactive while magazine control circuits remain at full voltage. Thus, the magazine circuits may be checked in all phases of operation under power conditions, magazine chain motion being effected manually by means not shown. When switch S-19 is set in the RUN position, the firing key S-3 maintains full control of the magazine.

The master controls for the several drives i.e. elevation, train, and magazine are all located in the gun captain's compartment 124 in the top center of the mount shield. The loading team exerts a secondary influence on magazine motion by the manually operated switch S-5 at the loader device.

In loading the magazine 118, two major circuits are employed. These circuits are referred to as the "prepare to load" circuit and the "load" circuit. The "prepare to load" circuit includes four operational circuits herein designated as the "forward inch," "reverse hold," "reverse inch," and "load ready" circuits. Within the "load" circuit are circuits referred to as "normal load completion" and "emergency load completion" circuits.

Normally a partial load remains in the magazine when firing is terminated. Under such conditions the sequence of circuit activation is that described immediately succeeding. In the unusual situation in which there are no rounds in the system and it is desired to load the latter, the "reverse inch," the "load ready," the "load," and "load completion" circuits described hereinafter, are sequentially activated.

Stated differently, the sequence of circuit activation in loading may be characterized by the sequence of energization of several of the most important relays. This sequence of relay energization is as follows under normal operating conditions: (1) the forward actuating and forward hold relays R-1 and R-13, respectively; (2) the reverse clear relay R-6; (3) the reverse actuating relay R-5; (4) the reverse hold relay R-12; (5) the reverse inch relay R-8; (6) the reverse stop relay R-3; (7) the forward actuating and forward hold relays R-1 and R-13, respectively; and (8) the load completion relay R-2. In the event of an emergency during which it is desired to fire, the partial load relay R-22 is energized immediately, before the load energization of the load completion relay R-2. Reference will now be made to the details of FIGS. 22A and 22B.

*"Forward inch" circuit*

Thus, if a partial load is in the magazine and it is desired to either unload the magazine or reload the magazine to capacity, ganged switch contacts S-1 are first set in the LOAD position. Under normal conditions, a round will be on switch linkage 521, in the adjacent magazine-to-gun-round-transfer mechanism, causing the possibility of a jam. To reverse the operation of the magazine, the magazine is first operated in the forward direction for a sufficient interval of time to move the round off linkage 521 to thereby close switch contacts S-15(2) so that the "reverse hold" circuit, described hereinafter, can be completed.

In order that the magazine drive may be operated in the forward direction several circuits must be completed. The first circuit to be completed may be traced from the left side of the 115 volt line through bypass door switch contacts S-4, S-1(1), S-15(1), relay contacts RC-6(2), relays R-1 and R-13, the latter relay being in parallel with relay R-1, to the right side of the 115 volt line, it being understood that the bypass door forms no part of the present invention. Also the circuit through relay R-42 is completed as follows: from the left side of the 115 volt line through switch contacts S-1(6), relay R-42 to the right side of the 115 volt line. The energization of relay R-42 then closes the relay contacts RC-42(1) so that current may flow from one side of the 440 volt line through relay contacts RC-42(1), and the load speed shift solenoid L-3 to the other side of the 440 volt line thereby shifting the magazine drive into load speed. The shifting of the magazine drive into forward drive is completed from one side of the 440 volt line through relay contacts RC-13(2), closed by the energization of relay R-13, the forward shift solenoid L-1 to the other side of the 440 volt line. The magazine brake relay R-40 is now energized to release the brake on the magazine drive through circuitry which will now be described. Relay R-40 is first energized from the left side of the 115 volt line through relay contacts RC-1(1), and relay R-40 to the right side of the 115 volt line. Next, relay R-43 must be energized from the left side of the 115 volt line through switch contacts S-4, S-10(5), S-1(7), and relay R-43 to the right side of the 115 volt line. Now the magazine brake coil is energized by polarized 440 volt current flowing from one side of the rectifying bridge RB through now closed relay contacts RC-43(1), RC-40(2), and the magazine brake coil to the other side of the rectifying bridge.

At this time, the magazine clutch coil must be energized. Relay R-42, previously energized during completion of load speed shift closed relay contacts RC-42(2). The magazine clutch coil can now be energized by 440 volt current flowing from one side of the bridge RB through switch contacts S-30, relay contacts RC-42(2), resistor VR, relay contacts RC-41(2), and the magazine clutch coil to the other side of the bridge RB.

Now the continually running magazine drive motor is coupled to the magazine chain and will cause the latter to run in a forward direction at load speed. This operation continues until the first round clears switch linkage 521 in the associated magazine-to-gun-round-transfer mechanism.

*"Reverse hold" circuit*

When the first round clears linkage 521 the "reverse hold" circuit is completed. One leg of this circuit may be traced from the left side of the 115 volt line through switch contacts S–1(1), S–15(2), S–1(3), and reverse clear relay R–6 to the right side of the 115 volt line to thereby open relay contacts RC–6(2) to break the circuit to the forward actuating relay R–1 and the load forward hold relay R–13. Another leg of the "reverse hold" circuit may be traced from switch contacts S–1(3) through switch contacts S–7(2), S–6(2), S–18 (closed when gun elevation is within plus or minus 5 degrees of 0 degree elevation), relay contacts RC–3(3), RC–6(1) now closed and reverse actuating relay R–5 to the right side of the 115 volt line to thereby energize the reverse actuating relay R–5. The completion of this circuit also closes relay contacts RC–5(2) to energize relay R–40 and release the magazine drive brake by the 440 volt circuitry mentioned hereinbefore. The third leg of the "reverse hold" circuit be traced from relay contacts RC–6(1) through switch contacts S–8A(1) now closed by the round on switch linkage 504, also in the associated transfer mechanism, and reverse hold relay R–12 to the right side of the 115 volt line.

The completion of the foregoing circuits reverses the magazine drive by the opening of relay contacts RC–5(1) and the closing of the 440 volt circuit to the reverse shift solenoid L–2 through relay contacts RC–12(1) and is followed by re-energization of the brake and clutch relays R–40 and R–41, respectively, by means of the circuit from the left side of the 115 volt line through relay contacts RC–5(2) for relay R–40 and RC–5(3) for relay R–41, switch contacts S–30 being provided for relay R–41 circuitry only. The reverse operation of the magazine drive will lock in by means of relay contacts RC–12(3) and the opening of relay contacts RC–12(2) and RC–12(4), this preventing "reverse inch" continuity and also preventing the bypass of S–6 and S–7 switches, which will be later described. The reverse motion of the magazine chain will continue to move rounds backwardly through the magazine to thereby release switch linkages 504 and 359 until the first round depresses a lever (not shown) in the loader device, the depression of which opens switch contacts S–7(2). This causes the de-energization of relay R–12 and establishes the bypass circuit, hereinbefore mentioned, around the S–6 and S–7 switches in the loader device. Relays R–5 and R–6 remain energized as current is rerouted through relay contacts RC–12(4) bypassing the S–6 and S–7 switches to enable the magazine to continue operating even though switch contacts S–6(2), S–7(2) have been opened.

*"Reverse inch" circuit*

The de-energization of relay R–12 and the establishment of the bypass circuit around the S–6 and S–7 switches causes the completion of the "reverse inch" circuit, the reverse inch relay R–8 being energized through switch contacts S–8A(2) and relay contacts RC–12(2). The energization of the reverse inch relay R–8 closes relay contacts RC–8(1) in the reverse stop circuit and establishes a bypass circuit around relay contacts RC–12(1) for solenoid L–2, now open, via relay contacts RC–8(2) to thereby maintain reverse clutch engagement. The operation of the "reverse inch" circuit continues for a short interval of time until cam 316 closes switch contacts S–13 to energize reverse stop relay R–3.

*"Load ready" circuit*

The closing of switch contacts S–13 energizes the "load ready" circuit which stops the magazine drive. This is accomplished by the energization of relay R–3 which causes relay contacts RC–3(3) to be opened thereby breaking the circuits to relays R–5, R–8, R–40, and R–41. The de-energization of relays R–5, R–8, R–40, and R–41 eliminates clutch torque and causes the magnetic brake to be applied to the magazine drive. It will be appreciated that cam 316 is so formed and adjusted that the magazine chain stops in the proper position to receive rounds from the adjacent loading device. A loader gate or round engaging fingers 224 which normally depend into the path of oncoming rounds in the associated loader device are raised out of this path by the energization of solenoid L–5 through the following circuit: from the left side of the 115 volt line through switch contacts S–1(4), relay contacts RC–22(2), switch contacts S–9(2), relay contacts RC–3(4), loader gate operating solenoid L–5 to the right side of the 115 volt line leaving the magazine in "load ready" condition.

*"Load" circuit*

The position of the first round switch contacts S–8B at the exit end of the associated transfer mechanism, or any other suitable mechanism between the magazine and gun, is in the closed position when there is no round on switch linkage 504. Normally open relay contacts RC–2(1) are in parallel with the normally open round actuated switch contacts S–6(1) and in series with the normally open round actuated switch contacts S–7(1), both of the latter switches having their actuators 232 in the associated loader device. It will be understood that rounds must be loaded in the loader device to close switch contacts S–6(1) and S–7(1) and provide circuit continuity.

To load, the operator closes the manual switch S–5 whereupon the following circuit is completed: from the left side of the 115 volt power line through switch contacts S–1(1), round actuated switch contacts S–8B, switch contacts S–6(1), switch contacts S–7(1), manual switch S–5, the forward actuating relay R–1, to the right side of the 115 volt line. The completion of the circuit just mentioned causes the magazine drive to be shifted into forward gear by closing 440 volt circuits to solenoid L–1, relays R–40 and R–41 through relay contacts RC–13(2), RC–1(1) and RC–1(3), respectively. The magazine drive is locked in forward gear by means of relay contacts RC–13(1), and the now bypassed loader switch contacts S–5 may be opened. Thus, chain travel in the forward direction is initiated, this motion continuing unless the feeding of ammunition is delayed or when the ammunition in the loader device has been loaded into the magazine, either of which will cause the circuit to be broken by the opening of switch contacts S–6(1).

The loader gate 224 is lowered in response to the de-energization of solenoid L–5 which occurs when the magazine is filled and the first round passes over switch linkage 359 to open the normally closed switch contacts S–9(2) to open the circuit from the left side of the 115 volt power line through switch contacts S–1(4), partial load relay contacts RC–22(2), switch contacts S–9(2), the reverse stop relay contacts RC–3(4), loader gate solenoid L–5 to the right side of the 115 volt line.

*"Normal load completion" circuit*

The first round engaging switch linkage 359 at the exit end of the magazine closes switch contacts S–9(1) to complete a circuit through relay contacts RC–3(2), closed during the "reverse inch" operation and remaining closed, to energize the load completion relay R–2, this circuit being traced as follows: from the left side of the 115 volt line through switch contacts S–1(4), switch S–9(1), relay contacts RC–3(2), load completion relay R–2 to the right side of the 115 volt line.

The closing of the load completion relay contacts RC–2(1) bypasses the loader device switch contacts S–6(1) and S–7(1) through the following circuit: from the left side of the 115 volt power line through switch contacts S–1(1), switch contacts S–8B, load completion relay contacts RC–2(1), RC–13(1), and the forward actuating relay R–1 to the right side of the 115 volt line.

Thus, when the forward actuating relay R–1 is energized, the load forward hold relay R–13, which is in parallel with relay R–1, is energized thereby closing relay contacts RC–13(1) and RC–13(2) to bypass switch contacts S–5 from relay contacts RC–2(1) to the relay R–1. In addition, the 440 volt magazine drive circuit upon the closing of relay contacts RC–13(2) completes the forward clutch shifting circuit from one side of the 440 volt line through relay contacts RC–5(1), RC–13(2) and the forward shift solenoid L–1 to the opposite side of the 440 volt line.

Therefore, the magazine drive operates in the forward direction to unload the loader device and move an equivalent number of rounds into the associated transfer mechanism 112 where the first round reaching the exit end of the transfer mechanism depresses switch linkage 504 to open switch contacts S–8B thereby breaking the load circuit from switch contacts S–1(1) through switch contacts S–8B, relay switch contacts RC–2(1), RC–13(1) through relay R–1, the load circuit being opened at switch contacts S–8B which de-energizes the forward actuating relay R–1.

"Emergency load completion" circuit

If at any time during the loading operation it is desired to fire without further loading of the magazine, the operator manually closes partial load switch contacts S–22 which energize partial load relay R–22 through a circuit which is traced from the left side of the 115 volt power line through switch contacts S–1(2), switch contacts S–22, partial load relay R–22 to the right side of the 115 volt line. The partial load relay R–22 locks itself in the circuit by the closure of its contacts RC–22(3) which are normally open, the closing of these contacts RC–22(3) completing a bypass circuit around manual switch contacts S–22.

The closing of relay contacts RC–22(1) establishes a bypass around switch contacts S–9(1) and energizes the load completion relay R–2 from the left side of the 115 volt line through switch contacts S–1(4), relay contacts RC–22(1), relay contacts RC–3(2), previously closed by energization of reverse stop relay R–3, load completion relay R–2 to the right side of the 115 volt line. Therefore, the normally open relay contacts RC–2(1) close and complete the circuit bypassing the loader device switch contacts S–6(1) and S–7(1) through the circuit from the left side of the 115 volt line through switch contacts S–1(1), switch contacts S–8B, relay contacts RC–2(1), RC–13(1) (previously closed by energization of relay R–13) and forward actuating relay R–1 to the right side of the 115 volt line. The completion of this circuit allows the magazine chain to continue to operate in the forward direction until the first round opens switch contacts S–8B to break the circuit through the de-energization of forward actuating relay R–1 to thereby stop the operation of the magazine.

"Firing" circuit

The ganged S–1 switch contacts are set at the FIRE position and the ganged gun selector S–10 switches (FIG. 23) are set at BOTH, for example, if both guns are to be fired. The empty case chute door (not shown), which is located on the bottom of the mount at the lower end of the case ejection chute 128, is opened which closes switch contacts S–20. The firing key switch contacts S–3 are then manually closed to complete the primary circuit which may be traced as follows: from the left side of the 115 volt line through switch contacts S–20, S–3, S–10(3), S–1(3), and firing safety relay R–18 to the right side of the 115 volt line thereby closing relay contacts RC–18(1) and RC–18(2).

Figure 23:
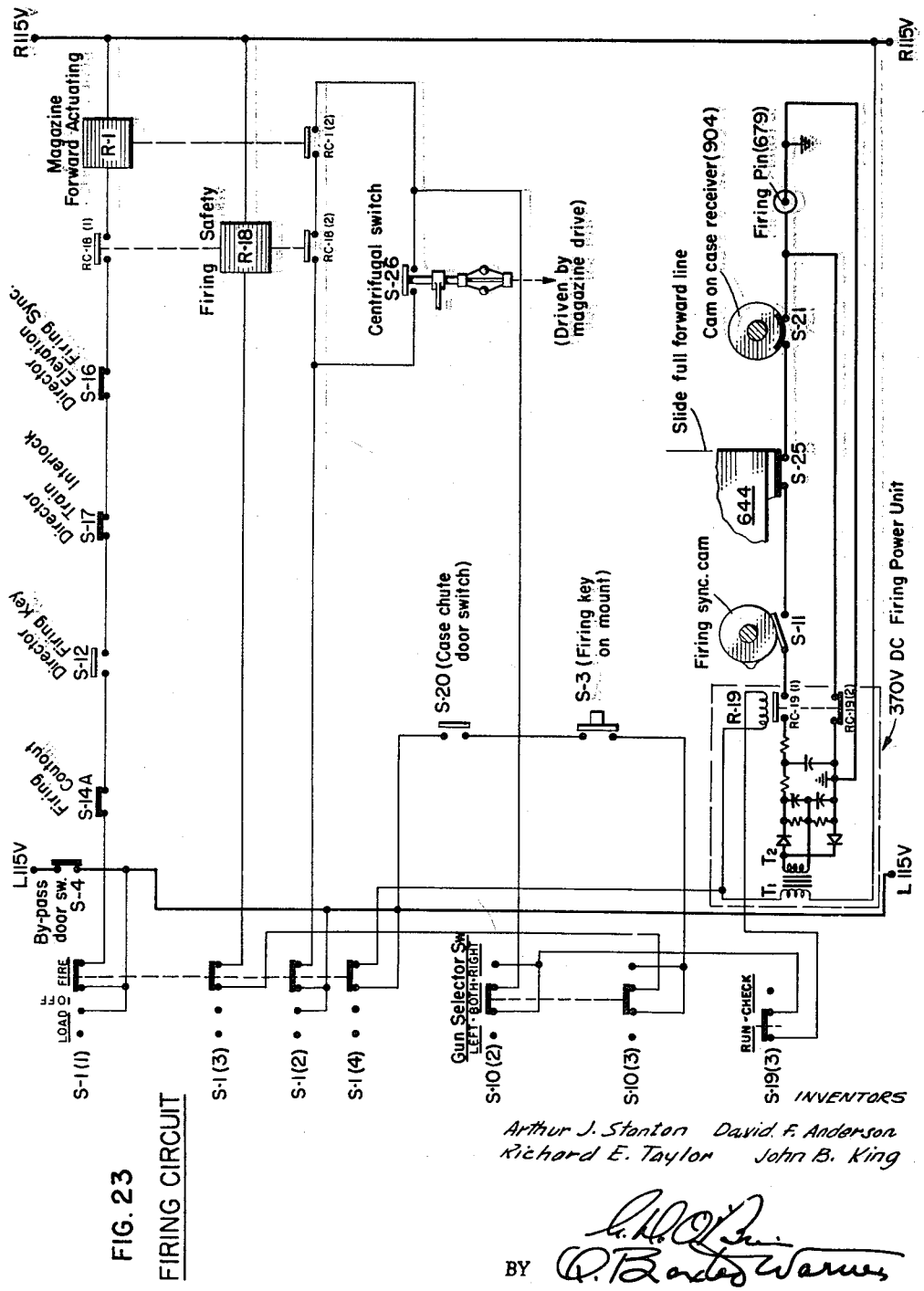
FIG. 23 represents a portion of the circuitry of FIGS. 22A and 22B and additional circuitry employed during firing operations.

When firing by director control, it will be understood that the bypass door 604 is normally closed and, therefore, switch contacts S–4 are closed, the firing cutout switch contacts S–14A are in the SAFE (position), i.e. none of the ship's structure is in the line of fire, the director firing key contacts S–12 are closed, and the train and elevation drive are synchronized with the director signal closing the director train interlock switch contacts S–17 and the director elevation interlock switch contacts S–16, FIG. 23, thereby completing the circuit through relay R–1 which may be traced as follows: from the left side of the 115 volt line through switch contacts S–4, switch contacts S–1(1), switch contacts S–14A, S–12, S–17, S–16, relay contacts RC–18(1), magazine forward actuating relay R–1 to the right side of the 115 volt line. This circuit actuates the magnetic clutch by the energization of relay R–14, FIG. 22A, for magazine drive 377 and releases the brake by the energization of the relay R–40 in the manner previously described. The magazine drive now operates at "fire" speed, relay R–44 having been previously energized by ganged switch contacts S–1(6), FIG. 22A, in the circuit from the left side of 115 volt line through switch contacts S–1(6), relay R–44, to the right side of 115 volt line, to complete the circuit in the 440 volt magazine drive unit through relay contacts RC–44(1) and the "fire" speed clutch solenoid L–4.

Now the firing circuit is established from the left side of the 115 volt line through switch contacts S–1(2), relay contacts RC–18(2) and RC–1(2), switch contacts S–10(2) and S–19(3), relay R–19 and transformer primary winding $T_1$ in the 370 volt D.C. power supply, to the right side of the 115 volt line. The completion of this circuit raises the potential of the direct current above ground potential and provides positive current to the firing synchronizing switch S–11 via now closed contacts RC–19(1) which are connected to the transformer secondary winding $T_2$.

The continuity will progress as the firing synchronizing switch contacts S–11 close. Switch S–11 is mounted on the top cover of the associated transfer mechanism, the latter forming no part of the present invention, and may be driven by transfer mechanism gearing so synchronized as to close in response to round travel from the transfer mechanism into the gun thereby causing each round to be fired in the proper relationship with the next succeeding round in the transfer mechanism. The slide of the gun will be released from its seared position in response to a round passing over a trigger finger in the gun mechanism to close switch contacts S–25 as the slide reaches its forward position. The rotary case ejector switch contacts S–21 are normally closed and are opened only by a round case striking a case retaining bar in the ejection system, more completely described in copending application Serial No. 663,321, filed June 3, 1957, for Gun Ejection Mechanism. Switch contacts S–21 interlock circuit action so that firing cannot take place while a case is entering the case ejector basket assembly. Therefore, the last stage of the firing circuit is completed from the 370 volt D.C. firing power unit through the interlock switches S–11, S–25, and S–21 to the gun mechanism firing pin 679 and to ground. It will be understood that the current is rectified and stepped-up in the firing power unit, FIG. 23, from 115 volt. A.C. to 370 volt D.C. The current supplied to the firing power unit originates in the left side of the 115 volt line and then flows through switch S–1(4), the firing power unit primary winding $T_1$ to the right side of the 115 volt line.

The magazine drive motion closes the centrifugally operated switch contacts of S–26 which provides a secondary circuit around relay contacts RC–18(2) and RC–1(2) thus maintaining firing voltage until the magazine drive is virtually stopped. This action permits magazine drive deceleration to take place and gun firing to continue until feed motion ceases thereby preventing an ammunition bypass from occurring, more fully described in application Serial No. 663,319, afore-mentioned.

"Cease firing or magazine deceleration" circuit

When it is desired to terminate firing the operator releases the firing key so as to open firing key contacts S–3 thereby breaking the circuit through relay R–18 which, in turn, opens the circuit through relay contacts RC–18(1) to relay R–1, or by opening of firing director key S–12 to directly de-energize relay R–1.

Magazine chain and drive inertia will decrease, finally opening centrifugal switch contacts S-26 to break the last stage of the firing circuit. Thus, a few rounds will continue to be fired instead of being bypassed after the power to the magazine is cut off.

Summary of operation, magazine

The magazine 118 is an inverted U-shaped mechanism, and one magazine is provided for each gun. When the rounds have passed through the loader 120 they are at the forward lower end of the magazine. The pair of magazine feed star wheels 304, which operate in synchronism with round engaging lugs 317 carried by the magazine chains 309, move the rounds from the loader 120 into the magazine and onto the magazine chains. The path of travel of the rounds in the magazine is up the front leg of the magazine, across the top, down the back leg, and after making a series of such similar flights, the round emerges near the upper portion of the front leg. The magazine chains 309 are driven by sprockets 308′, and sufficient idler sprockets 308 and 310 are provided to maintain the chain configuration substantially identical to that of the various channels formed by the guide rails 331, 334 and 342 which are in guiding engagement with the rounds. Suitable cam and switch means 316 and S-13, respectively, are provided at the magazine entry end and control the magazine in reverse drive during unloading operation so that star wheels 304 will stop so as to be in a proper round receiving position upon resumption of magazine filling. At the exit end of the magazine, suitable switch means S-9 are provided for controlling the round engaging fingers 224 in the loader. Also, at the exit end of the magazine, a pair of magazine exit star wheels 353 cooperate with a series of star wheels 406 and 407 on the associated round transfer mechanism which is relatively movable with respect to the magazine. The presence of the round at the exit end of the magazine causes switch S-9 to be opened thereby de-energizing solenoid 226 in the loader which, in turn, causes the round stop fingers 224 to move into the loader feed path and prevent further rounds from entering the loader. The magazine will continue to operate for a sufficient interval of time to empty the loader and to feed an equivalent number of rounds as were remaining in the loader into the adjacent transfer mechanism.

Electrical system

Two major circuits are employed during the loading of the magazine 118. These circuits are referred to as the "prepare to load" circuit and the "load" circuit. Four operational circuits are included within the "prepare to load" circuit and are designated as the "forward inch," "reverse hold," "reverse inch," and "load ready" circuits. Within the "load" circuit are circuits referred to as the "normal load completion" and "emergency load completion" circuits.

Under normal operating conditions, a partial load remains in the magazine when firing is terminated, and the sequence of relay energization during reloading is as follows: (1) the forward actuating and forward hold relays R-1 and R-13, respectively; (2) the reverse clear relay R-6; (3) the reverse actuating relay R-5; (4) the reverse hold relay R-12; (5) the reverse inch relay R-8; (6) the reverse stop relay R-3; (7) the forward actuating and forward hold relays R-1 and R-13, respectively; and (8) the load completion relay R-2. If during loading it becomes necessary to fire the weapon, the partial load relay R-22 is energized before the energization of the load completion relay R-2.

Thus, under normal conditions, when a partial load is in the magazine and it is desired to either unload the magazine or reload the magazine to capacity, ganged switch contacts S-1 are first set in the LOAD position. The magazine must first be operated in the forward direction for a sufficient interval of time to move the round which will normally be on switch linkage 521 at the exit end of the associated transfer mechanism off this switch linkage so that the "reverse hold" circuit can be completed. However, several circuits must first be completed before the magazine drive may be operated in the forward direction, the completion of the first circuit energizing the forward actuating relay R-1 and the load forward hold relay R-13. The second circuit is completed through relay R-42 to energize the latter thereby establishing current flow through the load speed shift solenoid L-3 and shifting the magazine drive into load speed. The third circuit to be completed is through the forward shift solenoid L-1. The fourth circuit is through the magazine brake relay R-40, the completion of this circuit releasing the brake on the magazine drive. Finally, the circuit through the magazine clutch coil is completed. Upon the completion of the foregoing circuits the magazine chain is coupled to the magazine drive motor, and the chain will run in a forward direction at load speed until the first round clears switch linkage 521.

The "reverse hold" circuit is completed when the first round clears linkage 521. One leg of this circuit includes the reverse clear relay R-6 which functions to break the circuit to the forward actuating relay R-1 and the load forward hold relay R-13. Another leg of the "reverse hold" circuit includes the reverse actuating relay R-5. The energization of relay R-5 causes the energization of relay R-40 thereby releasing the magazine drive brake, the brake having been applied when the circuit to the forward actuating relay R-1 was broken. The third leg of the "reverse hold" circuit includes the reverse hold relay R-12. Upon the completion of the "reverse hold" circuit the operation of the magazine drive is reversed in response to current flowing through the reverse shift solenoid L-2 and brake and clutch relays R-40 and R-41, respectively. The reverse operation of the magazine drive locks in and continues to move rounds backwardly through the magazine thereby releasing switch linkages 504 and 359. The reverse operation continues until the first round depresses a lever (not shown) in the associated loader device and opens switch contacts S-7(2). This causes the de-energization of reverse hold relay R-12 and establishes a bypass circuit around switches S-6 and S-7. The reverse actuating relay R-5 and the reverse relay R-6 remain energized to enable the magazine to continue operation even though switch contacts S-6(2), S-7(2) have been opened.

The "reverse inch" circuit is completed when the reverse hold relay R-12 is de-energized and the bypass circuit around the S-6 and S-7 switches has been established. The "reverse inch" circuit includes the "reverse inch" relay R-8 which functions, upon energization, to maintain reverse clutch engagement. The operation of the magazine drive is under the influence of the "reverse inch" circuit for a short interval of time until cam 316 closes the switch contacts S-13 to energize the reverse stop relay R-3.

The "load ready" circuit, which stops the magazine drive, is energized in response to the closing of the switch contacts S-13, this being accomplished by the energization of the reverse stop relay R-3 which functions to break the circuits to relays R-5, R-8, R-40, and R-41. When the circuits to the latter four relays are broken, clutch torque is eliminated and the magazine brake is applied to the magazine drive. The energization of the reverse stop relay R-3 also causes the loader gate or round engaging fingers 224, which normally depend into the path of the oncoming rounds, to be raised out of this path in response to the energization of solenoid L-5. The magazine is now in a "load ready" condition.

When it is desired to load, the operator closes the manual switch S-5 whereupon the forward actuating relay R-1 is energized and the magazine drive is shifted into forward gear by the closing of the circuits through solenoid L-1, relay R-40 and relay R-41. Thus, chain travel in a forward direction is initiated and continued unless the feeding of ammunition is delayed by a break in the continuity of rounds passing through the loader device. When the first round passes under switch linkage 359 solenoid L–5 is de-energized and the loader gate 224 is lowered into the path of round travel in the loader chute to prevent further rounds from entering the loading mechanism.

A first round engaging switch linkage 359 at the exit end of the magazine causes the completion of the circuit through the load completion relay R–2 to establish a by-pass circuit around the loader and switch contacts S–6(1) and S–7(1) through the forward actuating relay R–1 and the load forward hold relay R–13. The energization of the relay R–13 causes the completion of the forward clutch shifting circuit through the forward shift solenoid L–1, the magazine drive operating in the forward direction to unload the loader chute 200 and move an equivalent number of rounds into the adjacent transfer mechanism 112, the latter forming no part of the present invention. When the first round reaches the exit end of the transfer mechanism and depresses switch linkage 504, the "load" circuit is broken thereby de-energizing the forward actuating relay R–1 to stop forward operation of the magazine drive.

If it is desired to fire the weapon during the loading operation but without further loading of the magazine, the operator manually closes the partial load switch contacts S–22 which causes the energization of the partial load relay R–22 which, in turn, causes the energization of the load completion relay R–2 which effects the establishment of a bypass circuit around the loading chute switch contacts S–6(1) and S–7(1). The completion of this bypass circuit allows the magazine chain to continue to operate in the forward direction until the first round opens switch contacts S–8B to break the circuit through the de-energization of forward actuating relay R–1 to thereby stop the operation of the magazine.

When it is desired to fire the weapon, the ganged S–1 switch contacts are set at the FIRE position and the ganged gun selector S–10 switches, FIG. 23, are set at BOTH, for example, if both guns are to be fired. The empty case chute door (not shown) is opened to close switch contacts S–20 and the firing key switch contacts S–3 are manually closed to complete the primary firing circuit through the firing safety relay R–18 which causes energization of forward actuating relay R–1. This circuit actuates the magnetic clutch by the energization of relay R–41 for the magazine drive and releases the brake by the energization of the relay R–40. The magazine drive now operates at "fire" speed, relay R–44 having been previously energized to complete the circuit in the 440 volt magazine drive unit and the "fire" speed clutch solenoid L–4. The firing circuit is now established through relay R–19, the firing synchronizing switch S–11 causing each round to be fired in the proper relationship with the next succeeding round in the associated transfer mechanism. The last stage of the firing circuit is completed through interlock switches S–11, S–25, and S–21 and firing pin 679 to ground. By the action of the centrifugal operated switch S–26 gun firing continues during magazine drive deceleration until the feed motion ceases thereby preventing an ammunition bypass from occurring.

To terminate firing the operator releases the firing key thereby breaking the circuit through firing safety relay R–18 which, in turn, causes the de-energization of the magazine forward actuating relay R–1. As the magazine chain and drive inertia decreases, the centrifugal switch contacts S–26 finally open to break the last stage of the firing circuit.

Obviously many modifications and variations of the present invention are possible in the light of the above teachings. It is therefore to be understood that within the scope of the appended claims the invention may be practiced otherwise than as specifically described.

What is claimed is:

1. A substantially self-balancing ammunition magazine trainable with and operable with a rapid fire gun elevatable about a gun trunnion axis, said magazine comprising an elongate flexible carrier for carrying rounds of ammunition through the magazine, support means in engagement with said carrier for supporting and guiding the carrier thoughout its travel, means for guiding the rounds throughout their travel, drive means for said carrier, a loading station adjacent the carrier and at one side of the magazine for introducing rounds to the carrier, an unloading station located adjacent the carrier, centrally of the magazine and remote from the loading station for receiving rounds from the carrier, cam means at said unloading station for unloading rounds from the magazine regardless of elevation of the gun, said carrier being disposed in a substantially balanced circuitous path of travel for moving the rounds from the loading station to the unloading station so as to fill successively and substantially equally the magazine on opposite sides of a vertical plane including the gun trunnion axis to thereby maintain a substantially uniform weight balance of the magazine during loading and unloading operations.

2. A substantially balanced ammunition magazine trainable with and employed with an elevatable rapid fire gun and comprising a round entry station and a round exit station, round carrier means communicating with said entry and exit stations, said carrier means being disposed and traveling along a substantially balanced circuitous path extending from the entry station to and partially enveloping the exit station in a manner such that the weight of objects moved by the carrier means is substantially equally distributed about the exit station of the magazine, cam means carried by said magazine at the exit station thereof, and means cammed by said cam means between operative and inoperative positions in accordance with gun elevation for providing guidance to rounds leaving the magazine regardless of gun elevation.

3. A substantially self-balancing ammunition magazine trainable with and operable with a rapid fire gun elevatable about a gun trunnion axis, said magazine comprising; a plurality of flexible members for carrying rounds of ammunition through the magazine, spacer means connected to and disposed between said flexible members for maintaining said members in laterally spaced relationship, said spacer means including a plurality of cross elements secured to said flexible members, a first series of round engaging members mounted on said cross elements for contacting the round in a plane normal to the longitudinal axis of the latter, a second series of round engaging members mounted on the cross members for contacting the rounds adjacent the ends of the latter, support means in engagement with said flexible members for supporting and guiding the flexible members throughout their travel, means for guiding the rounds throughout their travel, drive means for said flexible members, a loading station adjacent the flexible members and at one side of the magazine for introducing rounds to the flexible members and an unloading station located adjacent the flexible members, centrally of the magazine and remote from the loading station for receiving rounds from the flexible members, means at said unloading stations for unloading rounds from the magazine regardless of the elevation of the gun, said flexible members being disposed in a substantially balanced circuitous path of travel for moving the rounds from the loading station to the unloading station so as to fill successively and substantially equally the magazine on opposite sides of a vertical plane including the gun trunnion axis to thereby maintain a substantially uniform weight balance of the magazine during loading and unloading operations.

4. A substantially self-balancing ammunition magazine trainable with an operable with a rapid fire gun elevatable about a gun trunnion axis, said magazine comprising an elongate flexible carrier for carrying rounds of ammunition through the magazine, a first series of parallel vertically inclined rail members at one end of the magazine, a second series of parallel vertically inclined rail members at the other end of the magazine and a third series of parallel horizontally disposed rail members joining said first and second series of members forming a continuous path for the flexible carrier, means for guiding the rounds throughout their travel, drive means for said carrier, a loading station adjacent the carrier and at one side of the magazine for introducing rounds to the carrier, an unloading station located adjacent the carrier, centrally of the magazine and remote from the loading station for receiving rounds from the carrier, means at said unloading station for unloading rounds from the magazine regardless of elevation of the gun, said carrier being disposed in a substantially balanced circuitous path of travel for moving the rounds from the loading station to the unloading station so as to fill successively and substantially equally the magazine on opposite sides of a vertical plane including the gun trunnion axis to thereby maintain a substantially uniform weight balance of the magazine during loading and unloading operations.

5. A substantially self-balancing ammunition magazine trainable with and operable with a rapid fire gun elevatable about a gun trunnion axis, said magazine comprising an elongate flexible carrier for carrying rounds of ammunition through the magazine from a loading station to an unloading station, support means in engagement with said carrier for supporting and guiding the carrier throughout its travel, means for guiding the rounds throughout their travel, drive means for said carrier, the loading station being disposed adjacent the carrier and at one side of the magazine, guide means for controlling the attitude and path of the round leaving the carrier regardless of elevation of the gun, control means for limiting the number of rounds carried by the magazine, feed means drivenly connected to said drive means for engaging rounds leaving the carrier at the unloading station, said carrier being disposed in a substantially balanced circuitous path of travel for moving the rounds from the loading station to the unloading station so as to fill successively and substantially equally the magazine on opposite sides of a vertical plane including the gun trunnion axis to thereby maintain a substantially uniform weight balance of the magazine during loading and unloading operations.

6. A substantially self-balancing ammunition magazine trainable with and operable with a rapid fire gun elevatable about a gun trunnion axis, said magazine comprising an elongate flexible carrier for carrying rounds of ammunition through the magazine between loading and unloading stations, support means in engagement with said carrier for supporting and guiding the carrier throughout its travel, means for guiding the rounds throughout their travel, drive means for said carrier, guide means for controlling the attitude and path of the round leaving the carrier regardless of elevation of the gun, a round engaging switch actuator, switch means connected to said actuator, said switch means being electrically connected to an ammunition stop mechanism to prevent additional rounds in excess of a predetermined number from entering the loading station in response to rounds engaging said switch actuator, feed means drivingly connected to said drive means for engaging rounds leaving the carrier at the unloading station, said carrier being disposed in a substantially balanced circuitous path of travel for moving the rounds from the loading station to the unloading station so as to fill successively and substantially equally the magazine on opposite sides of a vertical plane including the gun trunnion axis to thereby maintain a substantially uniform weight balance of the magazine during loading and unloading operations.

7. An ammunition magazine trainable with a rapid fire gun and fixed in elevation regardless of elevation of the gun and comprising a pair of transversely spaced endless chains disposed in a generally inverted U-shaped configuration and in a circuitous reversing manner within each leg of the inverted U-shaped configuration, means for maintaining the attitude of the rounds constant at all stages of travel, means for feeding rounds to said chains, and star wheels and guiding means for removing and guiding rounds from the chains regardless of elevation of the gun.

8. An ammunition magazine trainable with a rapid fire gun and fixed in elevation regardless of elevation of the gun and comprising a pair of transversely spaced endless chains disposed in a generally inverted U-shaped configuration and in a circuitous reversing manner within each leg of the inverted U-shaped configuration, means for maintaining the attitude of the rounds constant at all stages of travel, means for feeding rounds to said chains, star wheels and guiding means for removing and guiding rounds from the chains regardless of elevation of the gun, horizontally and vertically inclined guide rails for constraining the chains in the desired configuration, and a plurality of sprocket shafts for supporting and driving the chains.

9. An ammunition magazine trainable with a rapid fire gun and fixed in elevation regardless of elevation of the gun and comprising a pair of transversely spaced endless chains disposed in a generally inverted U-shaped configuration and in a circuitous reversing manner within each leg of the inverted U-shaped configuration, horizontally and vertically inclined guide rails for constraining the chains in the desired configuration, a plurality of sprocket shafts for supporting and driving the chains, connecting means between each pair of rounds and connecting the chains to one another, a plurality of round engaging elements carried by said connecting means, a plurality of round engaging retainers carried by said connecting means for engaging the round ends and preventing transverse movement thereof relative to the chains, means for feeding rounds to said chains, and star wheels and guiding means for removing and guiding rounds from the chains regardless of elevation of the gun.

10. An ammunition magazine trainable with a rapid fire gun and fixed in elevation regardless of elevation of the gun and comprising a pair of transversely spaced endless chains disposed in a generally inverted U-shaped configuration and in a circuitous reversing manner within each leg of the inverted U-shaped configuration, horizontally and vertically inclined guide rails for constraining the chains in the desired configuration, a plurality of sprocket shafts for supporting and driving the chains, connecting means between each pair of rounds and connecting the chains to one another, a plurality of round engaging elements carried by said connecting means, a plurality of round engaging retainers carried by said connecting means for engaging the round ends and preventing transverse movement thereof relative to the chains, means for feeding rounds to said chains, star wheels and guiding means for removing and guiding rounds from the chains regardless of elevation of the gun, means for insuring the movement of rounds into the space between said connecting means as the rounds are fed to the chains for carriage thereby, and means for moving the rounds into the mechanism.

11. An ammunition magazine trainable with a rapid fire gun and fixed in elevation regardless of elevation of the gun and comprising a pair of transversely spaced endless chains disposed in a generally inverted U-shaped configuration and in a circuitous reversing manner within each leg of the inverted U-shaped configuration, horizontally and vertically inclined guide rails for constraining the chains in the desired configuration, a plurality of sprocket shafts for supporting and driving the chains, connecting means between each pair of rounds and connecting the chains to one another, a plurality of round engaging elements carried by said connecting means, a plurality of round engaging retainers carried by said connecting means for engaging the round ends and preventing transverse movement thereof relative to the chains, means for feeding rounds to said chains, star wheels and guiding means for removing and guiding rounds from the chains regardless of elevation of the gun, means for insuring the movement of rounds into the space between said connecting means as the rounds are fed to the chains for carriage thereby, means for moving the rounds into the mechanism, and means for synchronizing the movement of rounds into the mechanism with the movement of the chains.

References Cited by the Examiner

UNITED STATES PATENTS

| | | | |
|---|---|---|---|
| 1,402,487 | 1/22 | Fooks | 198—103 |
| 1,411,247 | 3/22 | Weilmann | 198—137 |
| 2,355,100 | 8/44 | Nordquist | 198—103 |
| 2,787,366 | 4/57 | Sykokis | 198—137 |
| 2,988,962 | 6/61 | Finn | 89—33 |

FOREIGN PATENTS 583,410  6/46  Great Britain.

BENJAMIN A. BORCHELT, *Primary Examiner.*

ARTHUR M. HORTON, FRED C. MATTERN, Jr.,
*Examiners.*